United States Patent
Suita

(10) Patent No.: US 6,531,674 B2
(45) Date of Patent: Mar. 11, 2003

(54) WELDING GUN AND METHODS CONDUCTED USING THE SAME

(75) Inventor: Kazutsugu Suita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 29 days.

(21) Appl. No.: 09/920,841

(22) Filed: Aug. 3, 2001

(65) Prior Publication Data

US 2001/0045413 A1 Nov. 29, 2001

Related U.S. Application Data

(62) Division of application No. 09/451,149, filed on Nov. 30, 1999, now Pat. No. 6,313,427.

(30) Foreign Application Priority Data

Dec. 1, 1998 (JP) .......... 10-341213

(51) Int. Cl.$^7$ .......... B23K 11/24
(52) U.S. Cl. .......... 219/86.41; 219/109; 73/1.01
(58) Field of Search .......... 219/109, 170, 219/86.41, 91.1; 73/1.79, 1.01

(56) References Cited

U.S. PATENT DOCUMENTS

| | | | |
|---|---|---|---|
| 4,447,697 A | 5/1984 | Dunne et al. | |
| 4,639,574 A | 1/1987 | Arnoldt et al. | |
| 5,405,075 A | 4/1995 | Narita et al. | |
| 5,510,593 A | 4/1996 | Sakai | |
| 5,582,747 A | 12/1996 | Sakai et al. | |
| 5,628,923 A | 5/1997 | Nishiwaki | |
| 5,714,730 A | 2/1998 | Geiermann et al. | |
| 5,988,486 A | 11/1999 | Kobayashi et al. | |
| 6,044,308 A | * 3/2000 | Huissoon | 219/86.7 |
| 6,118,095 A | 9/2000 | Nagano | |
| 6,124,693 A | 9/2000 | Okanda et al. | |
| 6,205,839 B1 | * 3/2001 | Brogårdh et al. | 219/86.41 |
| 6,225,590 B1 | 5/2001 | Farrow | |
| 6,232,572 B1 | 5/2001 | Kanjo | |
| 6,342,686 B1 | * 1/2002 | Farrow | 318/568.11 |
| 6,356,807 B1 | * 3/2002 | McGee et al. | 219/110 |
| 6,408,252 B1 | * 6/2002 | De Smet | 219/110 |
| 6,415,191 B1 | * 7/2002 | Pryor | 219/86.41 |

FOREIGN PATENT DOCUMENTS

| | | |
|---|---|---|
| DE | 19917896 A1 | 10/1999 |
| EP | 0644014 | 3/1995 |
| JP | 7-64615 | 3/1995 |
| JP | 7-108384 | 4/1995 |
| JP | 10-6026 | 1/1998 |
| JP | 10-94882 | 4/1998 |

* cited by examiner

Primary Examiner—Tom Dunn
Assistant Examiner—Colleen P. Cooke
(74) Attorney, Agent, or Firm—Pillsbury Winthrop LLP

(57) ABSTRACT

An intelligent welding gun is provided with a fixed side sensor in a fixed side portion. The mechanical impedance of the fixed side portion is kept small, which permits the mechanical impedance to be set in a range where the fixed side sensor can effectively detect at least one of a position of a fixed side welding tip and a pressing force imposed on the fixed side welding tip. The fixed side sensor and a moving side sensor constitute a redundant sensor measurement system. Various kinds of methods conducted using the above welding gun include a method of calibrating a sensor (including calibration of a reference point and a gain), a control method of suppressing a welding expulsion, a re-welding feedback control method, a control method of a welding strength, a control method of reducing a clearance between workpieces, a method of correcting a welding robot track, and a method of managing a positional accuracy change at a welding point.

2 Claims, 12 Drawing Sheets

FIG. 17
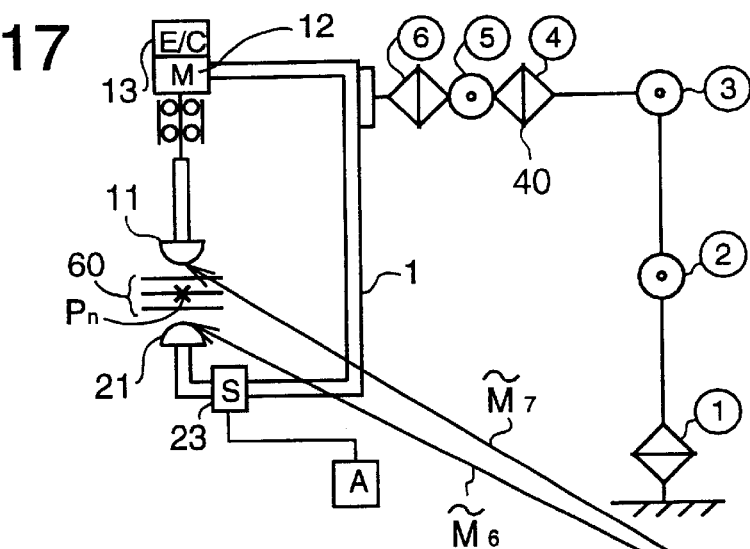
FIG. 18
|  | $\widetilde{M}_6$ | | $\widetilde{M}_7$ | |
|---|---|---|---|---|
|  | $x_1'$ | $x_2'$ | $x_1$ | $x_2$ |
| $p_1$ | | | | |
| $p_2$ | | | | |
| $p_3$ | | $\widetilde{P}$ | | |
| $p_4$ | | | | |
| | | | | |
| | | | | |
| $p_k$ | | | | |
FIG. 19
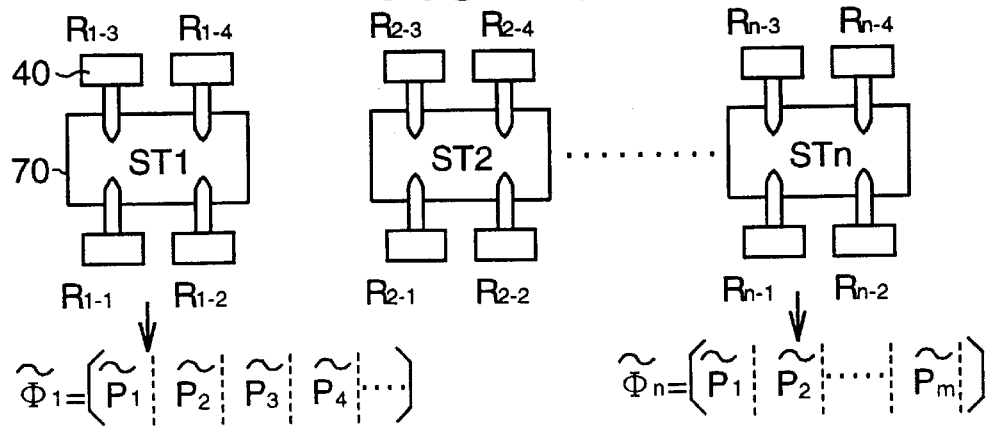

WELDING GUN AND METHODS CONDUCTED USING THE SAME

This is a divisional of U.S. Ser. No. 09/451,149 filed Nov. 30, 1999 now U.S. Pat. No. 6,313,427.

BACKGROUND OF THE INVENTION

1. Field of the Invention

The present invention relates to an intelligent welding gun provided with a sensor, and various kinds of methods conducted by using the welding gun including a calibration method of a sensor, a control method of welding (which includes, for example, a control method of a pressing force, a feedback control method of re-welding, a control method of welding strength, a control method of suppressing the generation of a weld expulsion, and a control method of a track of a welding robot), and a managing method of a change in a positional accuracy of a welding point.

2. Description of Related Art

Japanese Patent Publication No. 10-94882 discloses a method for controlling a pressing force of a welding gun. In the method, a small quantity of an elastic displacement, generated in a fixed side electrode tip when a moving side electrode tip is driven to contact the fixed side electrode tip and further driven to press the fixed side electrode tip, is detected by an encoder of a servo motor for driving the moving side electrode tip. More particularly, the elastic displacement is determined based on the rotation increment of the servo motor generated from the time when the moving side electrode tip begins to contact the fixed side electrode tip to when the electric current suddenly increases when the moving side electrode tip is further driven to press the fixed side electrode tip. A real pressing force between the electrode tips is calculated based on the measured elastic displacement of the fixed side electrode tip. Then, a setting pressing force between the electrode tips is modified to be equal to the calculated real pressing force.

However, there are the following problems with the above-described conventional method for controlling a welding gun.

First, since a moving side portion of the welding gun including the moving side electrode tip and the servo motor for driving the moving side electrode tip is provided with a speed reducer, a mechanical impedance of the moving side portion is greater and dynamically harder than that of a fixed side portion of the welding gun. In this instance, the mechanical impedance is defined as an impedance expressed by a vector of $|m, c, k|$, when a movement of the electrode tip is expressed by an equation:

$$m \cdot d^2x/dt^2 + c \cdot dx/dt + kx = F\ (t).$$

In a case where the vector only includes k, the mechanical impedance is a spring constant. The encoder is located on the opposite side of the moving side electrode tip with respect to the speed reducer of the servo motor, so that a pressing quantity of the moving side electrode tip, transmission of a change in the pressing displacement and the pressing force to the encoder through the speed reducer is a small amount and is delayed. As a result, the responsibility is lowered, so that it is difficult to obtain an accurate response with the conventional method, in which the welding gun is controlled based on an output of the encoder.

Second, since the rigidity of an arm supporting the fixed side electrode tip is increased so that the mechanical impedance of the fixed side portion including the fixed side electrode tip and the arm is nearly equal to the mechanical impedance of the moving side portion, the size and the weight of the arm is large, which causes the welding gun to be increased both in size and weight.

SUMMARY OF THE INVENTION

An object of the present invention is to provide a welding gun which enables control with a high response and accuracy, and to provide various kinds of control methods conducted using the welding gun.

Another object of the present invention is to provide a welding gun which allows an arm supporting a fixed side welding tip to be decreased in size and rigidity, and to provide various kinds of control methods conducted using the welding gun.

The present invention for achieving the above objects are, as follows:

A welding gun includes a moving side portion including a moving side welding tip and a driving device for driving the moving side electrode tip, and a fixed side portion including a fixed side welding tip and an arm supporting the fixed side welding tip. A fixed side sensor for detecting at least one of a position of the fixed side welding tip and a pressing force imposed on the fixed side welding tip is provided in the fixed side portion.

In the welding gun, a mechanical impedance of the fixed side portion is smaller than that of the moving side portion. The mechanical impedance of the fixed side portion is set in a range where the fixed side sensor can effectively detect the at least one of the position of the fixed side welding tip and the pressing force imposed on the fixed side welding tip.

The fixed side sensor is any one of a force sensor, an optical distance sensor and a sensor using an optical fiber.

A moving side sensor for detecting at least one of a position of the moving side welding tip and a pressing force caused in the moving side welding tip may be provided in the moving side portion. In that case, the fixed side sensor and the moving side sensor constitute a redundant sensor measurement system.

A first method, which is a method of calibrating a sensor conducted using the welding gun, includes: (a) releasing the moving side welding tip from a position of contact with the fixed side welding tip; and (b) calibrating a reference point of at least one of a pressing force information and a positional information of the fixed side sensor.

A second method, which is a method of calibrating a sensor conducted using the welding gun, includes: (a) increasing pressure of the moving side welding tip against the fixed side welding tip and plotting a pressing force and/or a positional information to obtain characteristic curves of the moving side sensor and the fixed side sensor using a method of least squares; and (b) determining gains of the sensors such that the gains of the moving side sensor and the fixed side sensor are equal to each other.

A third method, which is a control method of welding a workpiece conducted using the welding gun, includes: (a) determining whether an expansion quantity of a welding portion of the workpiece detected by the fixed side sensor is equal to or greater than a predetermined value, and ending welding of the current welding point when the expansion quantity is equal to or greater than the predetermined value; (b) increasing the welding electric current when the expansion quantity is smaller than the predetermined value; (c) counting the number of times the welding electric current is increased and determining whether a re-welding program should be conducted when the counted number of times exceeds a predetermined number, and ending welding at the current welding point when it is determined that the re-welding program should not be conducted; (d) conducting re-welding when it is determined that the re-welding program should be conducted; and (e) determining, when re-welding is conducted, whether the expansion quantity of the welding portion of the workpiece during re-welding is equal to or greater than the predetermined value, ending welding of the current welding point when the expansion quantity is equal to or greater than the predetermined value, while issuing a warning when the expansion quantity does not reach the predetermined value.

A fourth method, which is a control method of welding a workpiece conducted using the welding gun, includes: (a) obtaining an expansion quantity of a welding portion of the workpiece, a position and a pressing force of the fixed side welding tip, from detected values detected at every moment by the fixed side sensor; (b) determining whether an expulsion is generated in the welding portion by comparing at least one of a value of the pressing force and the position of the fixed side welding tip at a point when the expansion quantity begins to decrease with at least one of a value of the pressing force and the position of the fixed side welding tip after a predetermined period of time has passed from the beginning of the decrease in the expansion quantity; and (c) setting a welding electric current of a corresponding welding point in a next cycle to be equal to or greater than a welding electric current of the current welding point when expulsion is not generated, while setting the welding electric current of the corresponding welding point in the next cycle to be smaller than the welding electric current of the current welding point when the expulsion is generated, thereby reflecting the data of the current cycle on a welding condition of the next cycle.

A fifth method, which is a method of managing a welding quality conducted using the welding gun, includes storing data about an expansion quantity, information about whether re-welding has been conducted and information about whether expulsion has been generated into a memory at each welding point after welding of the each welding point has been conducted, and periodically storing the data into a managing system of a higher level.

A sixth method, which is a control method of welding a workpiece conducted using the welding gun, includes: (a) obtaining an expansion quantity of a welding portion of the workpiece, a position of the fixed side welding tip, a differential value of the position, a pressing force, and a differential value of the pressing force which change at every moment from detected values detected at every moment by the fixed side sensor; (b) determining whether a sign of an expulsion generation exists in the welding portion by comparing at least one of the differential value of the position of the fixed side welding tip and the differential value of the pressing force from the beginning of a decrease in the expansion quantity with a predetermined value, at every moment; and (c) decreasing or stopping the welding electric current, and/or, reducing the pressing force when the sign of the expulsion generation exists, thereby reflecting on the welding electric current and/or the pressing force in real-time.

A seventh method, which is a control method of welding a workpiece conducted using the welding gun, includes: (a) determining whether an expansion quantity of a welding portion of the workpiece detected by the fixed side sensor is equal to or greater than a predetermined value, and ending welding of the current welding point when the expansion quantity is determined to be equal to or greater than the predetermined value; (b) increasing a welding electric current when the expansion quantity is smaller than the predetermined value; and (c) decreasing the welding electric current when a decrease in the expansion quantity is found during welding.

An eighth method, which is a control method of a pressing force of welding conducted using the welding gun, includes: (a) detecting contacting positions $x_1$ and $x_1'$ of the moving side welding tip and the fixed side welding tip, respectively, with a workpiece when the moving side welding tip and the fixed welding tip begin to contact the workpiece; (b) calculating differentials between objective positions $x_T$ and $x_T'$ of the moving side welding tip and the fixed side welding tip, respectively, which are previously stored in a welding robot, and the contacting positions $x_1$ and $x_1'$, respectively; and (c) continuing pressing the workpiece, when differentials exist between the objective positions $x_T$ and $x_T'$ and the contacting positions $x_1$ and $x_1'$, respectively, based on gains proportional to the differentials until the differentials become zero.

A ninth method, which is a control method of a pressing force of welding conducted using the welding gun, includes: (a) detecting contacting positions $x_1$ and $x_1'$ of the moving side welding tip and the fixed side welding tip with a workpiece, respectively, when the moving side welding tip and the fixed welding tip begin to contact the workpiece; (b) calculating differentials between objective positions $x_T$ and $x_T'$ of the moving side welding tip and the fixed side welding tip, respectively, which are previously stored in the welding robot, and the contacting positions $x_1$ and $x_1'$, respectively; (c) continuing pressing the workpiece, when differentials exist between the objective positions $x_T$ and $x_T'$ and the contacting positions $x_1$ and $x_1'$, respectively, based on gains proportional to the differentials and returning to the step of calculating the differentials, while obtaining arriving positions $x_2$ and $x_2'$ of the moving side welding tip and the fixed side welding tip, respectively, from the current detected positions of the moving side welding tip and the fixed side welding tip when differentials do not exist; (d) calculating a pressing force $P_0$ required for the moving side welding tip and the fixed side welding tip to reach the arriving positions; (e) adding a pressing force $P_1$ necessary for welding to the pressing force $P_0$ and imposing the total pressing force $P_T$ which is a summation of the $P_0$ and $P_1$ on the workpiece; and (f) pressing a welding electric current between the moving side welding tip and the fixed side welding tip thereby conducting welding.

A tenth method, which is a method of correcting a track of a welding robot conducted using the welding gun, includes: (a) detecting contacting positions $x_1$ and $x_1'$ of the moving side welding tip and the fixed side welding tip with a workpiece, respectively, when the moving side welding tip and the fixed welding tip begin to contact the workpiece; (b) calculating differentials between objective positions $x_T$ and $x_T'$ of the moving side welding tip and the fixed side welding tip, respectively, which are previously stored in the welding robot, and the contact positions $x_1$ and $x_1'$, respectively; (c) continuing pressing the workpiece, when differentials exist between the objective positions $x_T$ and $x_T'$ and the contact positions $x_1$ and $x_1'$, respectively, based on gains proportional to the differentials and returning to the step of calculating the differentials, while obtaining arriving positions $x_2$ and $x_2'$ of the moving side welding tip and the fixed side welding tip, respectively, from current detected positions of the moving side welding tip and the fixed side welding tip, when differentials do not exist; and (d) correcting the objective positions so that the differentials between the objective positions $x_T$ and $x_T'$ and the arrival positions $x_2$ and $x_2'$, respectively, become zero.

An eleventh method, which is a method of managing a change in a positional accuracy of a welding point conducted using the welding gun, includes: (a) entering positional information $x_1$, $x_1'$, $x_2$ and $x_2'$ from a database storing contacting positions $x_1$ and $x_1'$ of the moving side welding tip and the fixed side welding tip with a workpiece at a time when the moving side welding tip and the fixed side welding tip begin to contact the workpiece, and arriving positions $x_2$ and $x_2'$ of the moving side welding tip and the fixed side welding tip at a time when the moving side welding tip and the fixed side welding tip have pressed the workpiece; (b) calculating a positional accuracy vector of a station with respect to a plurality of stations each having at least one robot, the matrix being defined by the following:

$$|\Phi_n|=[|P_1|, |P_2|, \ldots, |P_m|]$$

wherein,
n: a station number of the current station
m: the number of robots equal to or greater than 1, of station n
$|P_j|$: a positional accuracy matrix of a robot (No. j robot), obtained from the welding points $P_1, P_2, \ldots,$ and $P_k$ and positions $x_1$, $x_1'$, $x_2$, and $x_2'$ of the robot;
and (c) managing a change in a positional accuracy of the welding point of the workpiece based on a value and/or values: $|\Phi_n|-|\Phi_{n-1}|$ and/or $|\Phi_n|-|\Phi_1|$.

With the above welding gun, since the sensor is provided in the fixed side portion, the sensor can be disposed in a position where the mechanical impedance is smaller than that of the moving side portion and where is not disposed via a gear such as a speed reducer from the welding tip. As a result, a displacement of the welding tip and a pressing force imposed on the welding tip can be detected with high accuracy and a good response. By controlling the welding gun according to the output of the sensor, a scope of objects capable of being controlled is widened and the welding gun can be made intelligent.

With the above welding gun, since the mechanical impedance of the fixed side portion is set in a range where the sensor can effectively detect a displacement of the fixed side welding tip and the pressing force, the mechanical impedance of the fixed side portion can remain small, unlike a conventional welding gun in which the mechanical impedance of the fixed side portion is increased to be nearly equal to a mechanical impedance of the moving side portion. As a result, the arm supporting the fixed side welding tip can be decreased both in rigidity and in size as compared with the conventional welding gun, thereby making the welding gun compact and lightweight. Since the fixed side portion is not provided with a speed reducer gear or the like, the mechanical impedance of the fixed side portion is necessarily smaller than that of the moving side portion. By utilizing the small mechanical impedance as it is, the displacement of the fixed side welding tip when pressed is made large. Thus, sensitive and accurate detection is made possible, which also makes the welding gun intelligent.

With the above welding gun, since the fixed side sensor is any one of a force sensor (a load sensor), a distance sensor (a displacement sensor) and a sensor using an optical fiber, a commercial sensor can be used.

In the case where sensors are provided both in the fixed side portion and the moving side portion of the welding gun, the fixed side sensor and the moving side sensor can constitute a redundant sensor measurement system.

Therefore, by using one sensor, calibration of a reference point, confirmation of a normal operation, etc. of the other sensor can be performed.

In the first method that is a method of calibrating a sensor conducted using the welding gun, since the reference point of the fixed side sensor is calibrated in a state that the moving side welding tip is released from the fixed side welding tip, the reference point of the fixed side sensor can be calibrated based on an output from the moving side sensor.

In the second method that is a method of calibrating a sensor conducted using the welding gun, since the moving side welding tip is pressed against the fixed side welding tip and the gains of the moving side sensor and the fixed side sensor are adjusted, one sensor can calibrate the other sensor.

In the third method that is a method of controlling welding conducted using the welding gun, the method can be conducted without using the moving side sensor. Also, the method can be conducted even if the driving device for the moving side portion is not a servo motor but an air cylinder. Further, a re-welding feedback control can be performed. When the expansion quantity of the welding portion during welding does not reach the predetermined value even though the welding electric current is increased which may be caused by dust or the like adhering to the workpiece or by a malfunction of the apparatus re-welding is conducted, because it may work in the case of the adhesive dust or the like. If the expansion quantity of the welding portion still does not reach the predetermined value despite re-welding, it is determined that the apparatus has malfunctioned, and a warning is issued. The warning may be substituted with stoppage.

In the fourth method that is a method of controlling welding conducted using the welding gun, the method can be conducted without using the moving side sensor. Also, the method can be conducted even if the driving device for the moving side portion is not a servo motor but an air cylinder. Further, generation of the expulsion in the corresponding welding point in the next cycle can be suppressed. In a normal condition, the expansion quantity (or the pressing force) of the welding portion during welding generally increases and forms a positive exponential curve ($e^r$) and decreases and forms a negative exponential curve ($e^{-r}$) after reaching a peak (where the welding electric current stops). In contrast, when the expulsion is generated, the expansion quantity (or the pressing force) suddenly decreases simultaneously with the expulsion generation and then returns to a value smaller than that at the beginning of welding. When the expansion quantity is continuously detected and it is detected that the expansion quantity suddenly decreases as compared with the predetermined curve of the normal condition, it can be determined that the expulsion has just been generated, and the welding electric current of the corresponding welding point in the next cycle should be decreased. As a result, generation of the expulsion in the corresponding welding point in the next cycle can be suppressed. With respect to control of the welding gun, since a very small change in the expansion quantity has to be detected, it is difficult in the detected quantity and responsibility to perform an accurate control of the expansion quantity by using the conventional servo motor encoder. By using a welding gun provided with the fixed side sensor which can sense data on the order of every $10^{-6}$ seconds, an accurate detection and the aforementioned control are possible.

In the fifth method that is a method of managing a welding quality conducted using the welding gun, since data about the expansion quantity, information about whether re-welding has been performed and information about whether expulsion has been generated are stored into the memory at every welding point in the third and the fourth methods, and are periodically stored into the managing system of a higher level, welding quality can be managed.

In the sixth method that is a method of controlling welding conducted using the welding gun, the method can be conducted without using the moving side sensor. Also, the method can be conducted even if the driving device for the moving side portion is not a servo motor but an air cylinder. Further, generation of the expulsion in the current welding point can be suppressed. In a normal condition, the expansion quantity (or, the pressing force) of the welding portion during welding generally increases and forms a positive exponential curve ($e^t$) and decreases and forms a negative exponential curve ($e^{-t}$) after reaching the peak (where the welding electric current stops). In contrast, when the expulsion is generated, a gradient of the curve of the expansion quantity (or the pressing force) begins to decrease, then rapidly decreases and returns to a value smaller than that at the beginning of welding. When the expulsion is detected at every moment during welding and the gradient of the curve is then calculated at every moment and it is found that the gradient decreases more greatly than a predetermined allowable value, it is determined that a sign of the expulsion generation exists and the welding electric current is controlled to be decreased. As a result, generation of an expulsion in the current welding point can be suppressed. In the control, since a very small change in the gradient has to be detected, it is difficult in quantity and responsibility to perform an accurate control of the expansion quantity by using the conventional servo motor encoder. By using the welding gun provided with the fixed side sensor which can perform a control of the order of $10^{-6}$ seconds, an accurate detection and the aforementioned control are possible.

In the seventh method that is a method of controlling welding conducted using the welding gun, the method can be conducted without using the moving side sensor. Also, the method can also be conducted even if the driving device for the moving side portion is not a servo motor but an air cylinder. Further, in the seventh control method, the welding strength can be controlled. In general, there is a correlation between a welding electric current, and a nugget size and a thermal expansion quantity. In addition, there is a correlation between the nugget size and the thermal expansion quantity, and a welding strength. It is generally considered that the spot welding has a sufficient welding strength when the thermal expansion quantity reaches the predetermined value. Therefore, the welding electric current is increased until the thermal expansion quantity reaches the predetermined value. However, when the thermal expansion quantity decreases during pressing, which means that some welding expulsion is generated, the welding electric current is decreased. By repeating this routine during welding, spot welding having a necessary welding strength can be conducted in a minimum time period under a condition that expulsion is not generated.

In the eighth method that is a method of controlling welding conducted using the welding gun, both the fixed side sensor and the moving side sensor are used. The driving device for the moving side portion may be a servo motor or an air cylinder. In the eighth method, the control for the pressing force is conducted based on information about positions $x_1$, $x_1'$ of the moving side welding tip and the fixed side welding tip at a time when the welding tips reach the contacting points with a workpiece (at that time the electric current of the motor for diving the moving side welding tip suddenly increases). More particularly, differentials between the objective positions $x_T$ and $x_T'$ of the moving side welding tip and the fixed side welding tip and the contacting positions $x_1$ and $x_1'$ are calculated, respectively. When some differentials exist, which means that the workpieces have a clearance therebetween, the pressing force continues to be imposed on the workpiece based on gains proportional to the differentials. Due to this pressing, the workpieces are pressed and the clearance between the workpieces is eliminated. When the differentials become zero or the differentials do not exist, the arriving positions $x_2$ and $x_2'$ of the moving side welding tip and the fixed side welding tip are obtained from the currently detected positions $x_1$ and $x_1'$ of the moving side welding tip and the fixed side welding tip. Due to this operation, even if a clearance exists between the workpieces, the clearance is eliminated and then welding is conducted, so that a spot welding of a high quality causing no separation can be performed.

In the ninth method that is a method of controlling a pressing force of welding conducted using the welding gun, both the fixed side sensor and the moving side sensor are used. The driving device for the moving side portion may be a servo motor or may be an air cylinder. In the ninth method, controlling the pressing force is conducted based on information about positions $x_1$ and $x_1'$ of the moving side welding tip and the fixed side welding tip when the welding tips reach the contacting points with a workpiece (at that time the electric current of the motor for driving the moving side welding tip suddenly increases). More particularly, the differentials between the objective positions $x_T$ and $x_T'$ of the moving side welding tip and the fixed side welding tip and the contacting positions $x_1$ and $x_1'$ are calculated, respectively. When differentials exist, which means that the workpieces have a clearance therebetween, the pressing force continues to be imposed on the workpiece based on gains proportional to the differentials. Due to this pressing, the workpieces are pressed and the clearance between the workpieces is eliminated. When the differentials becomes zero or the differentials do not exist, the arriving positions $x_2$ and $x_2'$ of the moving side welding tip and the fixed side welding tip are obtained from the currently detected positions $x_1$ and $x_1'$ of the moving side welding tip and the fixed side welding tip. Then, the pressing force $P_0$ required for the welding tips to reach the respective arriving points is calculated. The pressing force $P_0$ is a force imposed on the workpieces in order to eliminate the clearance between the workpieces and therefore is a spring back force of the workpieces. A pressing force $P_1$ necessary for welding is further added to the pressing force $P_0$, and the total pressing force $P_0$ of $P_1$ and $P_T$ is imposed on the workpieces. Due to this operation, even if a clearance exists between the workpieces, the pressing force $P_1$ necessary for welding can be imposed on the workpieces, so that a spot welding of a high quality having a sufficient pressing force can be performed.

In the tenth method that is a method of correcting a track of a welding robot conducted using the welding gun, both the fixed side sensor and the moving side sensor are used. The driving device for the moving side portion may be a servo motor or may be an air cylinder. In the tenth method, controlling the pressing force is conducted based on information about positions $x_1$ and $x_1'$ of the moving side welding tip and the fixed side welding tip when the welding tips reach the contacting points with a workpiece (at that time the electrical current of the motor for driving the moving side welding tip suddenly increases). More particularly, the differentials between the objective positions $x_T$ and $x_T'$ of the moving side welding tip and the fixed side welding tip and the contacting positions $x_1$ and $x_1'$ are calculated, respectively. When differentials exist, which means that the workpieces have a clearance therebetween, the pressing force continues to be imposed on the workpieces based on gains proportional to the differential. Due to this pressing, the workpieces are pressed and the clearance between the workpieces is eliminated. When the differentials become zero or the differentials do not exist, the arriving positions $x_2$ and $x_2'$ of the moving side welding tip and the fixed side welding tip are obtained from the currently detected positions $x_1$ and $x_1'$ of the moving side welding tip and the fixed side welding tip. The arriving positions $x_2$ and $x_2'$ are real arriving positions. By correcting the objective positions $x_T$ and $x_T'$ to the real positions $x_2$ and $x_2'$, the track of the welding robot is modified and is prepared for welding of the corresponding welding point of the next cycle.

In the eleventh method that is a method of managing a change in a positional accuracy of a welding point conducted using the welding gun, both the fixed side sensor and the moving side sensor are used. The driving device for the moving side portion may be a servo motor or may be an air cylinder. In the eleventh method, the positional accuracy matrix of each station $|\Phi_n|$ is calculated from the contacting positions and pressing positions at the respective welding points and then the change in the positional accuracy at the welding point of the workpiece is managed based on the value and/or values of $|\Phi_n|-|\Phi_{n-1}|$ and/or $|\Phi_n|-|\Phi_1|$. Therefore, a deformation of the workpiece due to welding can be suppressed, for example, by changing the welding order of the welding points thereby obtaining an optimum welding order in which that the value of $|\Phi_n|-|\Phi_{n-1}|$ is further decreased.

BRIEF DESCRIPTION OF THE DRAWINGS

The objects, features, and advantages of the present invention will become more apparent and will more readily be appreciated by the following detailed description of the preferred embodiments illustrated by the accompanying drawings, in which:

FIG. 2b is a perspective view of an example of the fixed side sensor shown in FIG. 2a.

FIG. 3b is an enlarge view of an example of the fixed side sensor shown in FIG. 3a.

FIG. 17 is a schematic system diagram illustrating an example of an objective to which a managing method of a change in a positional accuracy at a welding point is applied using the welding gun according to the embodiment of the present invention;

FIG. 18 shows a positional accuracy matrix of the robot used in the managing method of a change in a positional accuracy at a welding point, which is conducted using the welding gun according to the embodiment of the present invention;

FIG. 19 is a plan view of stations each having welding robots, which is an example of the objective to which the managing method of a change in a positional accuracy at a welding point is applied using the welding gun according to the embodiment of the present invention;

DETAILED DESCRIPTION OF THE EMBODIMENTS

FIGS. 1–5 illustrate a welding gun according to an embodiment of the present invention. FIGS. 6–21 illustrate various kinds of methods conducted using the welding gun according to the embodiment of the present invention. The methods include, for example, a calibration method of a sensor, a confirmation method of a sensor operation, a control method of welding, and a managing method of welding data.

First, the welding gun according to the embodiment of the present invention will be explained with reference to FIGS. 1–5.

Figure 1:
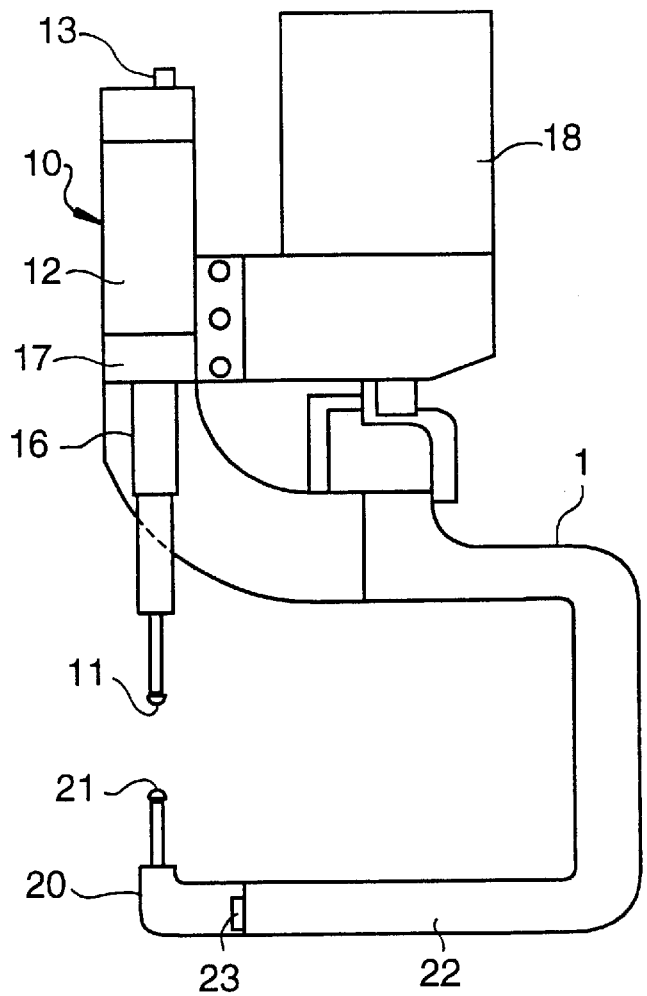
FIG. 1 is a side view of a welding gun according to an embodiment of the present invention.

As illustrated in FIG. 1, the welding gun 1 includes a moving side portion 10 including a moving side welding tip 11 and a driving device 12 for driving the moving side welding tip 11, and a fixed side portion 20 including a fixed side welding tip 21 and an arm 22 supporting the fixed side welding tip 21.

A fixed side sensor 23 is disposed in the fixed side portion 20 for detecting at least one of a position of the fixed side welding tip 21 and a pressing force imposed on the fixed side welding tip 21.

The welding gun 1 is supported by a welding robot, for example, of a six-axis, and a movement and a pressing force of the welding gun 1 is controlled by a control unit 30. The control unit 30 is a computer, for which a control unit of the welding robot 40 may be used.

Preferably, a moving side sensor 13 is also disposed in the moving side portion 10 for detecting at least one of a position of the moving side welding tip 11 and a pressing force caused in the moving side welding tip 11.

The driving device 12 may be a servo motor or an air cylinder. When the driving device 12 is a servo motor, a speed of the servo motor is reduced by a speed reducer 17 (which is generally a speed reducer of a motor with speed reducer). The rotation of the driving device is converted into a reciprocating linear motion by a mechanism of converting a rotation to a linear motion, such as a ball screw 16 or the like, and then is transmitted to a moving side welding tip 11.

When the driving device 12 is a servo motor, the moving side sensor 13 includes an encoder (a rotational position detection sensor) coupled to the servo motor. Reference numeral 18 expresses a transformer for a welding electric current.

The fixed side sensor 23 is disposed in the arm 22. The arm 22 may have a substantially C-shaped configuration, or may have other configurations, for example, a flat plate. The fixed side sensor 23 is disposed in a portion of the arm 22 which generates a compression stress or a tensile stress due to a bending moment caused when the pressing force is imposed on the fixed side welding tip 21.

The fixed side sensor 23 is constructed of, for example, a load sensor (a force sensor) 23A, an optical distance sensor (a position sensor) 23B, or a sensor 23D using an optical fiber. Information detected by the fixed side sensor 23 is transmitted in the form of an electrical signal.

Figure 2A:
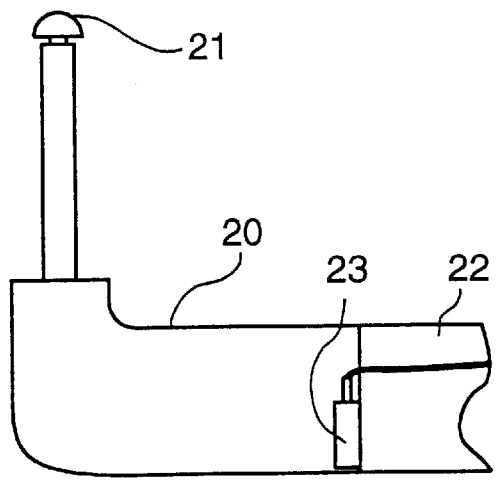
FIG. 2a is a partial cross-sectional view of the welding gun in accordance with the present invention.
Figure 2B:
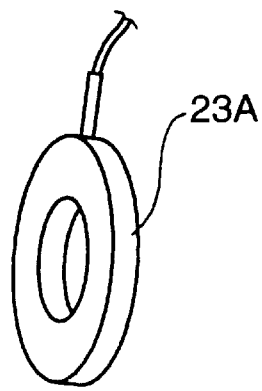

FIGS. 2a–2b illustrate an example where the fixed side sensor 23 is the force sensor 23A and is disposed in a portion of the arm 22, more particularly, in a lower-half portion with respect to a center line of the arm, which generates the compression stress due to a bending moment caused when a welding pressing force is imposed on the fixed side welding tip 21.

Figure 3A:
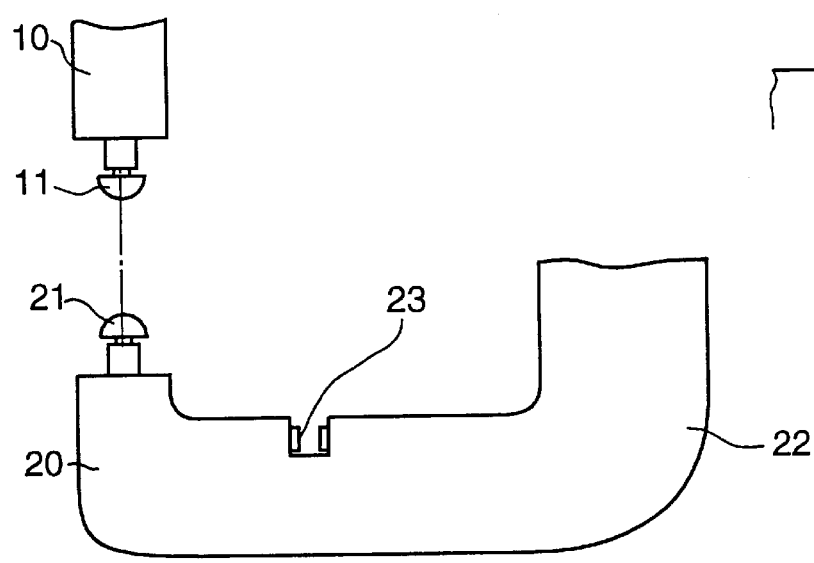
FIG. 3a is a cross-sectional view of the welding gun according to the embodiment of the present invention.
Figure 3B:
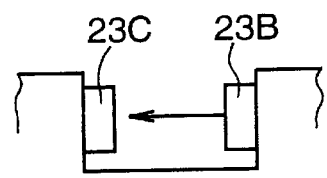

FIGS. 3a–3b illustrate an example where the fixed side sensor 23 is the optical distance sensor 23B and is disposed in a portion the arm 22, more particularly, in an upper half portion with respect to the center line of the arm (or in the lower-half portion in a case of compression stress), which generates a tensile stress (or compression stress in the case of the lower-half portion) due to a bending moment caused when a welding pressing force is imposed on the fixed side welding tip 21. Based on a dislocation between a light issue point and a light return point detected when the light is transmitted from the optical distance sensor 23B is reflected at a reflecting plate 23C and returns to the sensor, the magnitude of the bending moment and the magnitude of the pressing force imposed on the fixed side welding tip 21 are detected.

Figure 4:
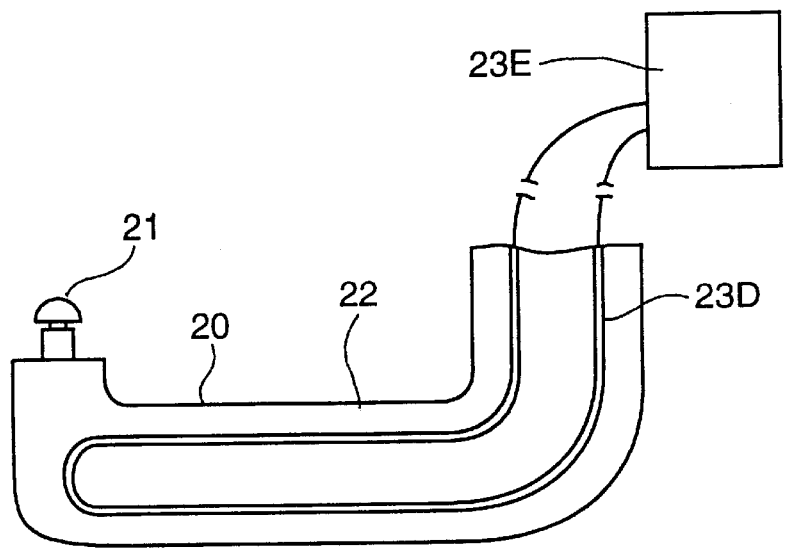
FIG. 4 is a cross-sectional view of another example of a fixed side sensor and the vicinity, of the welding gun according to the embodiment of the present invention.

FIG. 4 illustrates an example where the fixed side sensor 23 is an optical fiber 23D. The optical fiber is provided both in a portion of the arm 22 which generates tensile stress due to the bending moment caused when the pressing force is imposed on the fixed side welding tip 21 and in a portion of the arm which generates compression stress due to the bending moment caused when the pressing force is applied. When the pressing force is imposed on the fixed side welding tip 21, an optical path length difference generated in the optical fibers is detected by a detector 23E, so that the magnitude of the pressing force caused on the fixed side welding tip 21 is detected.

Figure 5:
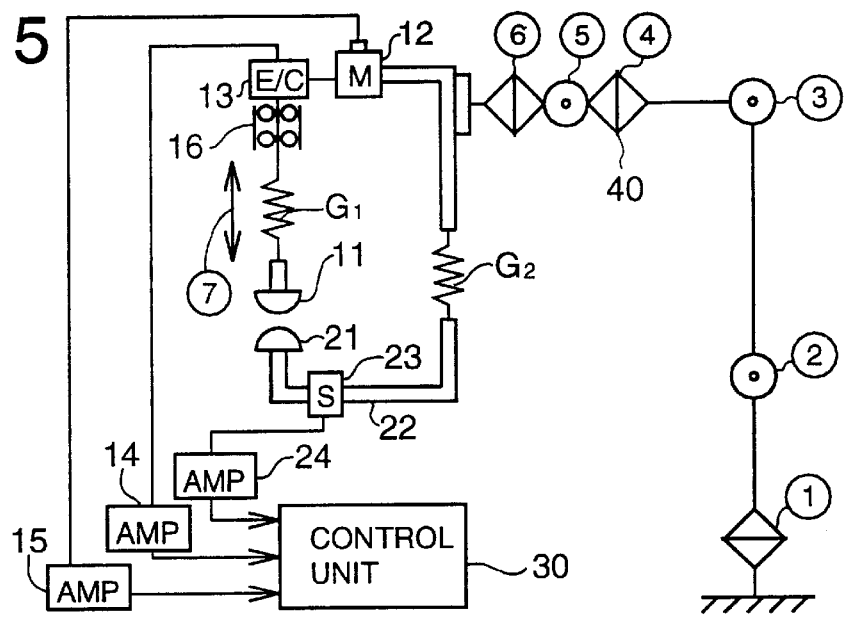
FIG. 5 is a system diagram illustrating the welding gun according to the embodiment of the present invention, and a welding robot to which the welding gun is coupled.

FIG. 5 is a system diagram illustrating the device of FIG. 1 in the form of a system. The output of the moving side sensor 13 is amplified by an amplifier 14. In a case of an analog signal, the analog signal is converted into a digital signal by an A/D (analog/digital) converter and then fed to the control unit 30. In the same manner, the output of the servo motor 12 is amplified by an amplifier 15. In a case of an analog signal, the analog signal is converted into a digital signal by the A/D converter and then fed to the control unit 30. In the same manner, the output of the fixed side sensor 23 is amplified by an amplifier 24. In a case of an analog signal, the analog signal is converted into a digital signal by, the A/D converter and then fed to the control unit 30.

In FIG. 5, the mechanical impedance of the moving side portion 10 is expressed by reference $G_1$ and the mechanical impedance of the fixed side portion 20 is expressed by reference $G_2$. In a conventional structure, since $G_1$ is generally greater than $G_2$ because a gear or the like are provided in the moving side portion 10, $G_2$ is designed to be approximately equal to $G_1$. In the embodiment of the present invention, the mechanical impedance $G_2$ is permitted to be smaller than $G_1$, and $G_2$ remains to be smaller than $G_1$.

The relationship between $G_1$ and $G_2$ is selected to be, for example, $G_2 \leq (1/2) G_1$. Preferably, the relationship is $G_2 \leq (1/5) G_1$. More preferably, the relationship is $G_2 \leq (1/10) G_1$. Due to the relationship, the mechanical impedance $G_2$ of the fixed side portion 20 is set in a range where the position of the fixed side welding tip 21 and the pressing force imposed on the fixed side welding tip 21 can be effectively detected by the fixed side sensor 23.

More particularly, when the moving side welding tip 11 is driven to press the fixed side welding tip 21 thereby causing displacements in the moving side welding tip and the fixed side welding tip 21, deformation caused in the fixed side portion 20 is greater than that caused in the moving side portion 10, that is, in a case satisfying the relationship: $G_2 \leq (1/10) G_1$, the deformation in the fixed side portion 20 occupies more than 90% of the total amount of deformation. As a result, the output of the fixed side sensor 23 is greater than that of the moving side sensor 13, so that controlling the welding gun based on the output of the fixed side sensor 23 is easier and more accurate.

With the above-described structure, it becomes possible to implement various types of controls not possible with the conventional structure having a moving side sensor 13 only. Accordingly, the welding gun 1 is made intelligent.

In a case where both the moving side sensor 13 and the fixed side sensor 23 are provided, the sensors 13 and 14 constitute a redundant sensor measurement system. The redundant sensor measurement system is defined as a system including more than two sensors, any one of which can perform calibration and operational confirmation, etc. of the other sensor.

Operations and advantages of the aforementioned welding gun 1 are as follows:

First, since the fixed side sensor 23 is disposed in the fixed side portion 20, the sensor 23 can be disposed in a portion which has a smaller mechanical impedance than the moving side portion 10 and need not be spaced via a gear such as a speed reducer from the welding tip, so that displacement of the welding tip and the pressing force can be detected with a high accuracy and a good response. By controlling the welding gun 1 based on the detected values, the scope of objects capable of being controlled is widened.

Second, since the magnitude of the mechanical impedance $G_2$ of the fixed side portion 20 is set in a range where the displacement of the fixed side welding tip 21 and the pressing force imposed on the fixed side welding tip 21 can be effectively detected by the fixed side sensor 23, the mechanical impedance $G_2$ is permitted to remain to be small, unlike the conventional structure in which the mechanical impedance $G_2$ of the fixed side portion 20 is made to be nearly equal to the mechanical impedance $G_1$ of the moving side portion. As a result, the rigidity and the size of the arm 22 supporting the fixed side welding tip 21 can be smaller than those of the conventional structure, thereby enabling the welding gun 1 to be compact and lightweight. Since the fixed side portion 20 is not provided with a gear reducer, the mechanical impedance $G_2$ is smaller than that of the moving side portion. As a result of this small mechanical impedance, the displacement of the fixed side welding tip 21 when pressed is large, so that sensitive and accurate detection can be conducted.

Third, in the case where the sensors are disposed both in the fixed side portion 20 and the moving side portion 10, respectively, the fixed side sensor 23 and the moving side sensor 13 constitute a redundant sensor measurement system. In the system, one sensor can perform calibration of reference points and confirmation of normal operation, etc. of the other sensor.

Next, various kinds of methods conducted using the welding gun 1 will be explained.

A first method, which is a method of calibrating a reference point of a sensor, and a second method, which is a method of calibrating a pressing force characteristic, will be explained with reference to FIGS. 6, 7 and 8.

The first method of calibrating the sensors 13 and 23 is conducted using the welding gun 1. The welding gun 1 includes a moving side portion 10 including a moving side welding tip 11 and a driving device 12 for driving the moving side welding tip 11, and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is disposed in the moving side portion 10 for detecting a position of the moving side welding tip 11 and a pressing force caused in the moving side welding tip 11.

The first method of calibrating the reference points of the sensors 13 and 23 includes steps of: releasing the moving side welding tip 11 from the fixed side welding tip 21; and calibrating the reference points of a pressing force and/or a positional information of the fixed side sensor 23 based on the output of the moving side sensor 13 and the electric current output of the servo motor 12.

The second method of calibrating the pressing force characteristics of the sensors 13 and 23 includes: increasing pressing of the moving side welding tip 11 against the fixed side welding tip 21 after having calibrated the reference points of the sensors 13 and 23, and plotting a pressing force information and/or a positional information to obtain characteristic curves of the moving side sensor 13 and the fixed side sensor 23 using a method of least square; and determining gains of the moving side sensor 13 and the fixed side sensor 23 so that the gains of the moving side sensor 13 and the fixed side sensor 23 are coincident with each other.

Figure 6:
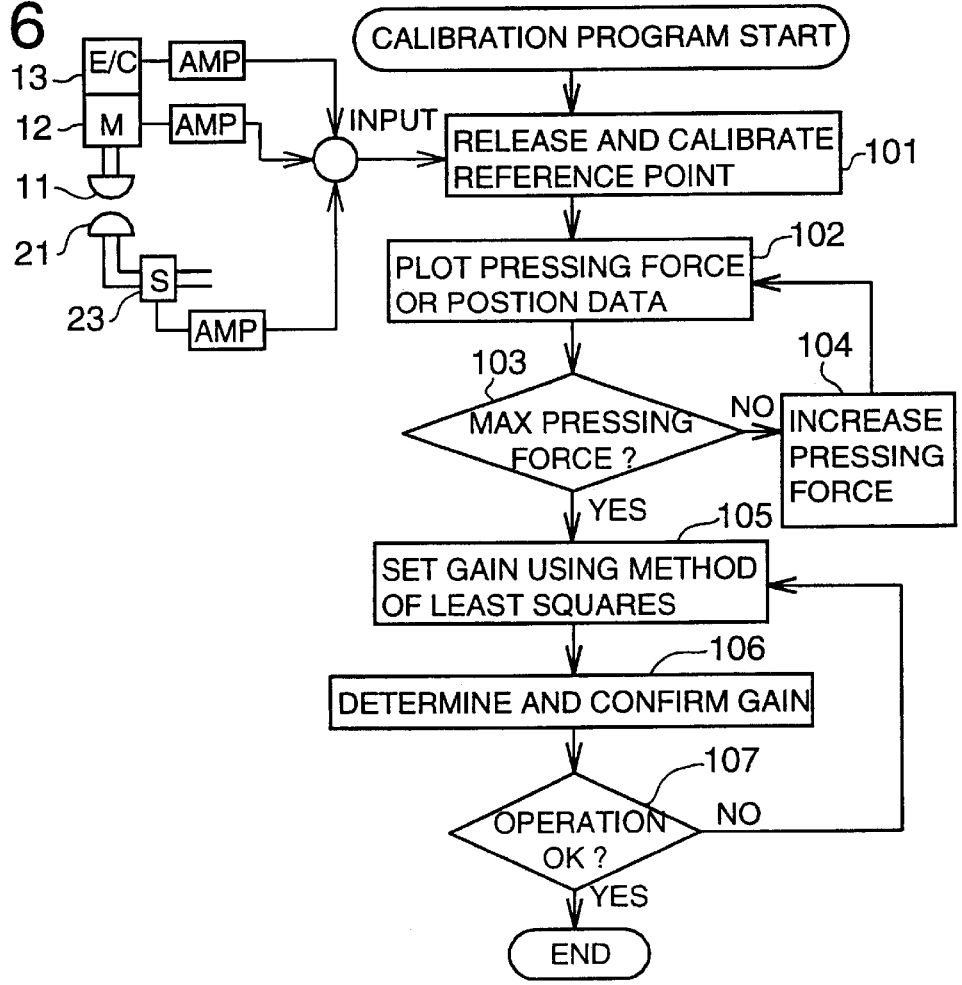
FIG. 6 is a flowchart illustrating a control routine of a method for calibrating a sensor, which is conducted using the welding gun according to the embodiment of the present invention.
Figure 7:
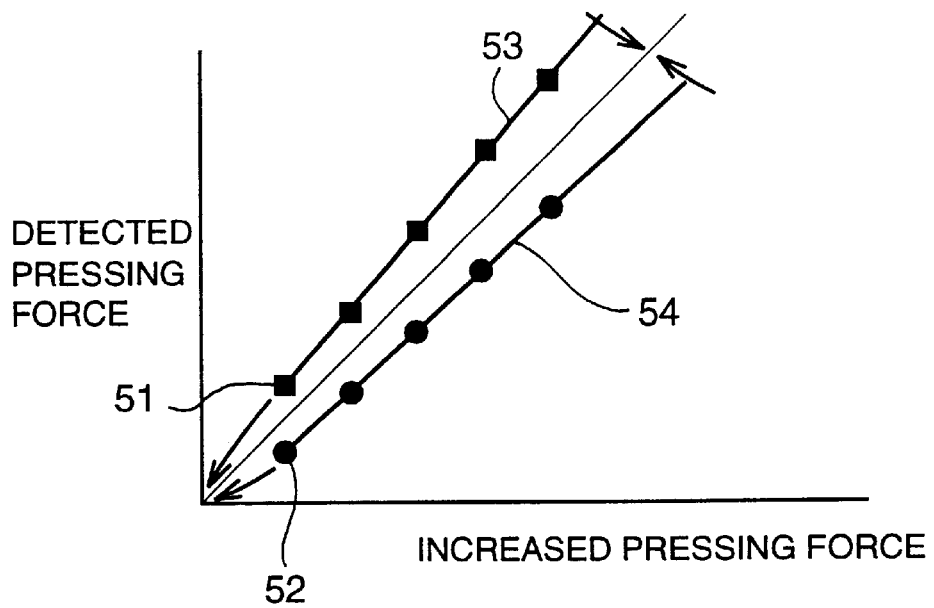
FIG. 7 is a graph showing plots of a sensor calibration and lines drawn by a method of least square.

FIG. 6 illustrates the calibration routine. The routine of FIG. 6 is stored in the control unit 30. The calibration routine includes a routine for calibrating the reference point and a routine for calibrating the pressing force.

The calibration routine is entered at an appropriate timing, for example, at a time before and after spot-welding of an automobile is conducted. However, entering the calibration routine is not limited to the above timing, and the calibration routine may be entered during performing the welding operation program. At step 101, signals issued from the servo motor 12, the moving side sensor 13 and the fixed side sensor 23 are amplified and input to the control unit 30. Then, the moving side welding tip 11 is released from the fixed side welding tip 21, and the reference point, for example zero point, of the pressing force information or the positional information of the fixed side sensor 23, or of both the moving side sensor 13 and the fixed side sensor 23 are calibrated. The release of the moving side welding tip 11 from the fixed side welding tip 21 is recognized by the electric current output of the servo motor 12 (from which it can be judged that the moving side welding tip 11 is in a released condition, because the welding electric current is suddenly increased when the moving side welding tip 11 begins to be pressed against the fixed side welding tip 21), and a positional signal from the moving side sensor 13, for example, the encoder. Since the outputs of the servo motor 12 and the moving side sensor 13 (for example, the encoder) generally have a high degree of accuracy and reliability, the reference point of the fixed side sensor 23 is calibrated according to the reference point of the moving side sensor 13.

Then, the routine proceeds to calibrating the pressing force (steps 102–107). At step 102, the moving side welding tip 11 is pressed against the fixed side welding tip 21 to impose the pressing force thereon. The pressing force is increased at step 104 by a predetermined load increment, for example, by every 100 kg, until the pressing force reaches the maximum value at step 103. The pressing force is increased by increasing the electric current of the servo motor 12, because a linear relationship exists between the servo motor electric current and the pressing force. At step 105, as illustrated in FIG. 7, the pressing force information (or the positional information which is proportional to the pressing force) which are the outputs of the moving side sensor 13 and the fixed side sensor 23 is plotted at every load, and then characteristic curves 53 and 54 of outputs of the moving side sensor 13 and the fixed side sensor 23 are obtained using the method of least squares. Then, the gains of the moving side sensor 13 and the fixed side sensor 23 are calculated so that the characteristic curves 53 and 54 are coincident with each other. In this instance, since a workpiece is not placed between the welding tips of the welding gun, the sensors 13 and 23 do not receive a reaction force from a workpiece, thus the characteristic curves ought to be coincident with each other. At step 106, a decision is made by an operator whether to set the calculated gains. If the decision is made to set the gains, the gains are set at step 107 and the calibration of the pressing force (or the position) is conducted, and the routine proceeds to the next operation program routine illustrated in FIG. 8. When the calculated gains are not set at step 107, the routine returns to step 105, where the gains are re-calculated. Due to the this operation, the pressing force characteristic (or the positional characteristic) can be calibrated.

Figure 8:
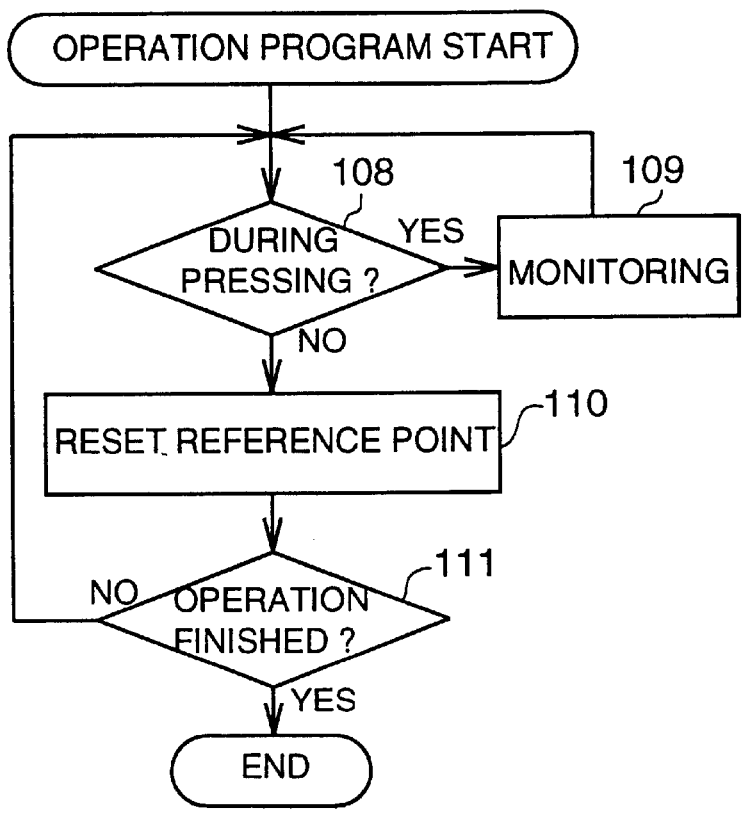
FIG. 8 is a flowchart illustrating a routine for an operation program conducted after the routine of FIG. 6.

Then, the routine proceeds to the operation program of FIG. 8 (steps 108–111). The routine is initiated at each welding point. At step 108, it is determined whether pressing of the welding gun is being conducted. If the welding electric current of the servo motor 12 is increasing, it can be determined that pressing of the welding gun is being conducted. When it is determined that the pressing is conducted, various kinds of monitoring can be conducted at step 109. During the monitoring, there may occur a case where the outputs of the moving side sensor 13 and the output of the fixed side sensor 23 are not coincident with each other due to a reaction force from the workpiece at the current welding point. In such a case, when welding is finished at the current welding point, that is, pressing of the welding gun is not being conducted, the routine proceeds to step 110, where the reference point, for example a zero point, is reset. This reset is a reset to the reference point which has been calibrated in the routine illustrated in FIG. 6. Then, at step 111, it is determined whether or not welding at a plurality of the welding points or at all of the welding points is finished. When the welding is not finished, the routine returns to step 108 and welding at the next welding point is repeated. When the welding is finished, the routine proceeds to an end.

A third method, a re-welding feedback control method, will be explained with reference to FIGS. 9 and 10.

The third method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is not necessarily disposed in the moving side portion 10. The driving device 12 may be a servo motor, or may be an air cylinder.

The third method includes:

① determining whether or not an expansion quantity of a welding portion of the workpiece detected by the fixed side sensor 23 is equal to or greater than a predetermined value, ending welding at the current welding point when the expansion quantity is equal to or greater than the predetermined value;

② increasing the welding electric current I(t) when the expansion quantity is smaller than the predetermining value;

③ counting the number of times of increasing the welding electric current I(t) and determining whether a re-welding program should be conducted when the counted number of times exceeds a predetermined number, ending welding at the current point when it is determined that the re-welding program should not be conducted;

④ conducing re-welding when it is determined that the re-welding program should be conducted; and ⑤ determining when re-welding is conducted whether the expansion quantity of the welding portion of the workpiece during re-welding is equal to or greater than the predetermined value, ending welding of the current welding point when the expansion quantity is equal to or greater than the predetermined value while issuing a warning when the expansion quantity does not reach the predetermined value.

Figure 10:
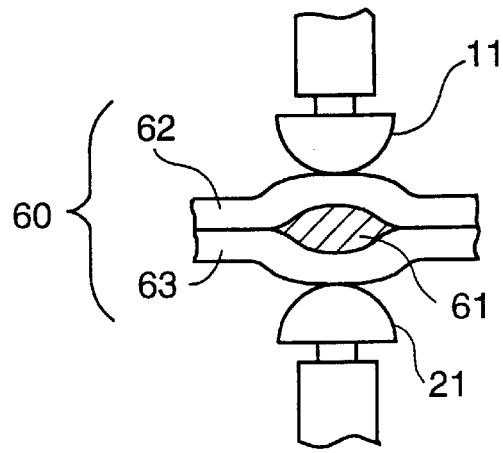
FIG. 10 is a cross-sectional view illustrating the relationship between a welding tip and a workpiece during the routine of FIG. 9.

In FIG. 10, since the mechanical impedance of the fixed side portion 20 is smaller than that of the moving side portion 10, almost all of the thermal expansion quantity (a displacement) of a welding portion 61 of a workpiece 60 is detected by the fixed side sensor 23. When the thermal expansion quantity of the welding portion 61 exceeds the predetermined value, it can be judged that a satisfactory welding has been conducted. Further, there is a correlation between the welding electric current and the thermal expansion quantity of the welding portion. More specifically, the more the welding electric current is, the more the thermal expansion quantity of the welding portion 61 is. It was found, however, that too much electric current causes dispersion of a weld magma (an expulsion generation), leading to a sudden decrease in the pressing force.

Figure 9:
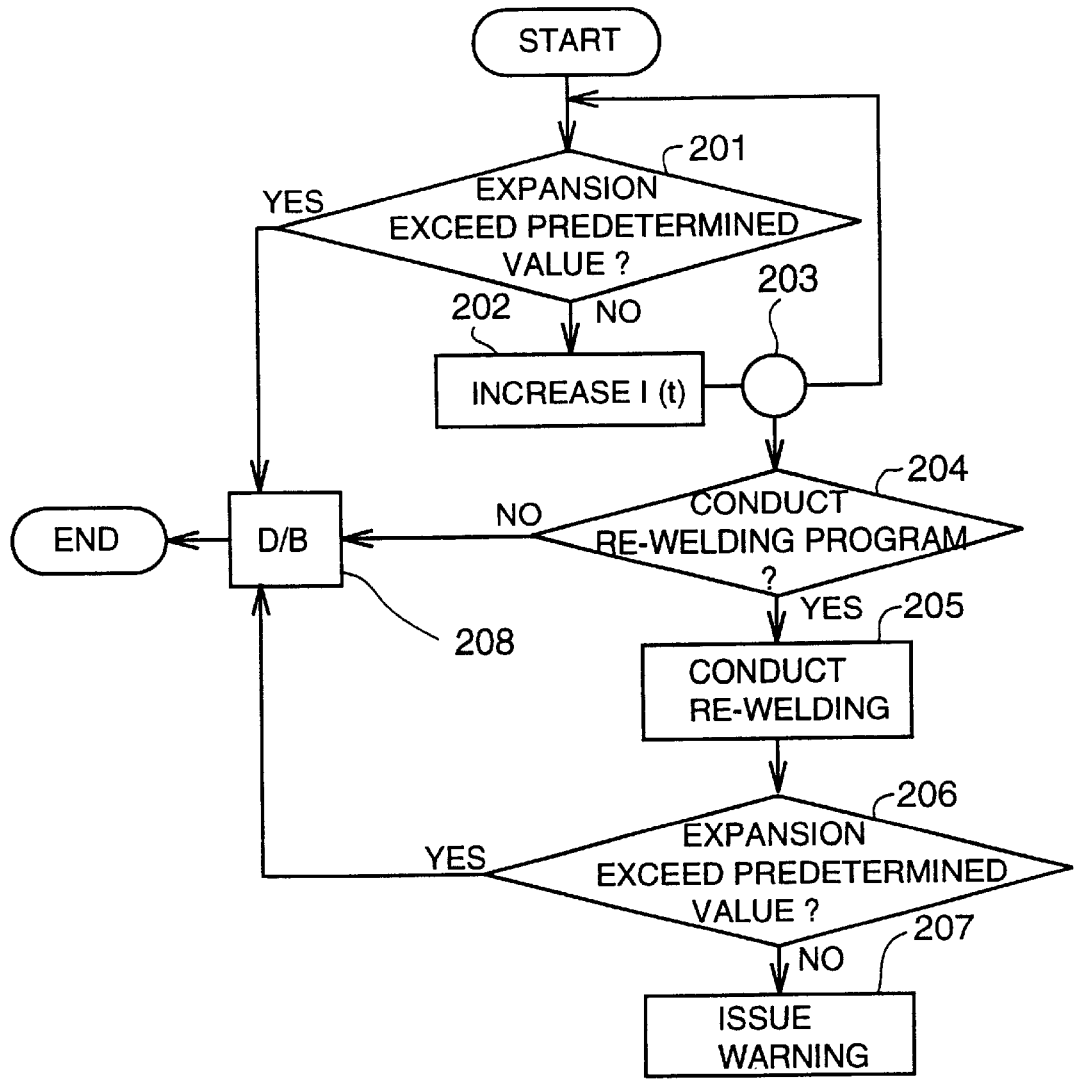
FIG. 9 is a flowchart illustrating a routine for re-welding feedback control, which is conducted using the welding gun according to the embodiment of the present invention.

FIG. 9 illustrates a control routine of the re-welding feedback control method. At step 201, it is determined at every moment whether or not the thermal expansion quantity $\delta$ of the current welding portion is equal to or greater than a predetermined value $\delta_s$. When the thermal expansion quantity $\delta$ exceeds the predetermined value $\delta_s$, the routine proceeds to step 208 where the thermal expansion quantity is stored into a database (D/B), and proceeds to an end step wherein the welding is finished at the current welding point and the robot moves to the next welding point. When it is determined that the thermal expansion quantity $\delta$ is smaller than the predetermined value $\delta_s$ at step 201, the routine proceeds to step 202, where the welding electric current I(t) is increased and then returns to step 201. Then, the number of times of passing through steps 201 and 202 is counted at step 203. When the number exceeds a predetermined number, the routine proceeds to step 204, where it is determined whether a re-welding program should be conducted. The reason why re-welding is conducted is that the re-welding program sometimes works well in a case where dust or the like adheres to the workpiece. When it is determined, by an operator or by comparing with a predetermined condition, that the re-welding program should not be conducted, the data are stored into the database at step 208 and the routine then proceeds to the end step, wherein welding at the current welding point is finished. When it is determined that the re-welding program should be conducted at step 204, the routine proceeds to step 205, where the re-welding is conducted. After the re-welding, the routine proceeds to step 206, where it is determined whether the thermal expansion quantity $\delta$ of the re-welding portion is equal to or greater than the predetermined value $\delta_s$. When the thermal expansion quantity $\delta$ exceeds the predetermined value $\delta_s$, the routine proceeds to step 208 where the data on the thermal expansion quantity are stored into the database (D/B), and then proceeds to the end step where welding at the current welding point is finished. When the thermal expansion quantity $\delta$ does not reach the predetermined value $\delta_s$, the routine proceeds to step 207, where a warning is issued.

Figure 13:
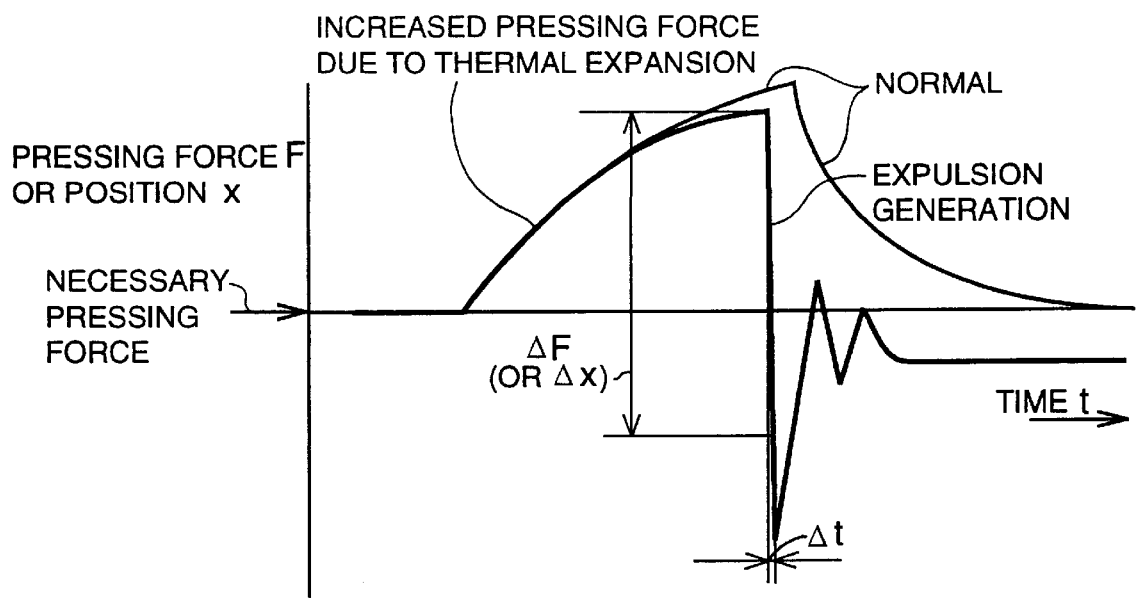
FIG. 13 is a graph illustrating a relationship between the expulsion generation, and a pressing force or a position of the welding tip.

A fourth method, a control method for suppressing an expulsion generation in a corresponding welding point in a next cycle, and a fifth method, which is a method of managing a welding quality, will be explained with reference to FIGS. 11 and 13.

The fourth and fifth methods are conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is not necessarily disposed in the moving side portion 10. The driving device 12 may be a servo motor, or may be an air cylinder.

The fourth method includes:

①  obtaining a thermal expansion quantity of a welding portion 61, a position and a pressing force of the fixed side welding tip 21, which change at every moment, from detected values detected at every moment by the fixed side sensor 23;

② determining whether an expulsion is generated in the welding portion 61 by comparing a value of the pressing force and/or the position of the fixed side welding tip 21 at a beginning of a decrease in the thermal expansion quantity with a value of the pressing force and/or the position of the fixed side welding tip 21 after a predetermined period of time has passed from the beginning of the decrease in the thermal expansion quantity; and ③ setting a welding electric current I(t)' of a corresponding welding point in a next cycle to be equal to or greater than a welding electric current I(t) of the current welding point when the expulsion is not generated, while setting the welding electric current I(t)' of the corresponding welding point in the next cycle to be smaller than the welding electric current I(t) of the current welding point when the expulsion is generated, thereby reflecting the data of the current cycle on a welding condition of the next cycle.

Figure 11:
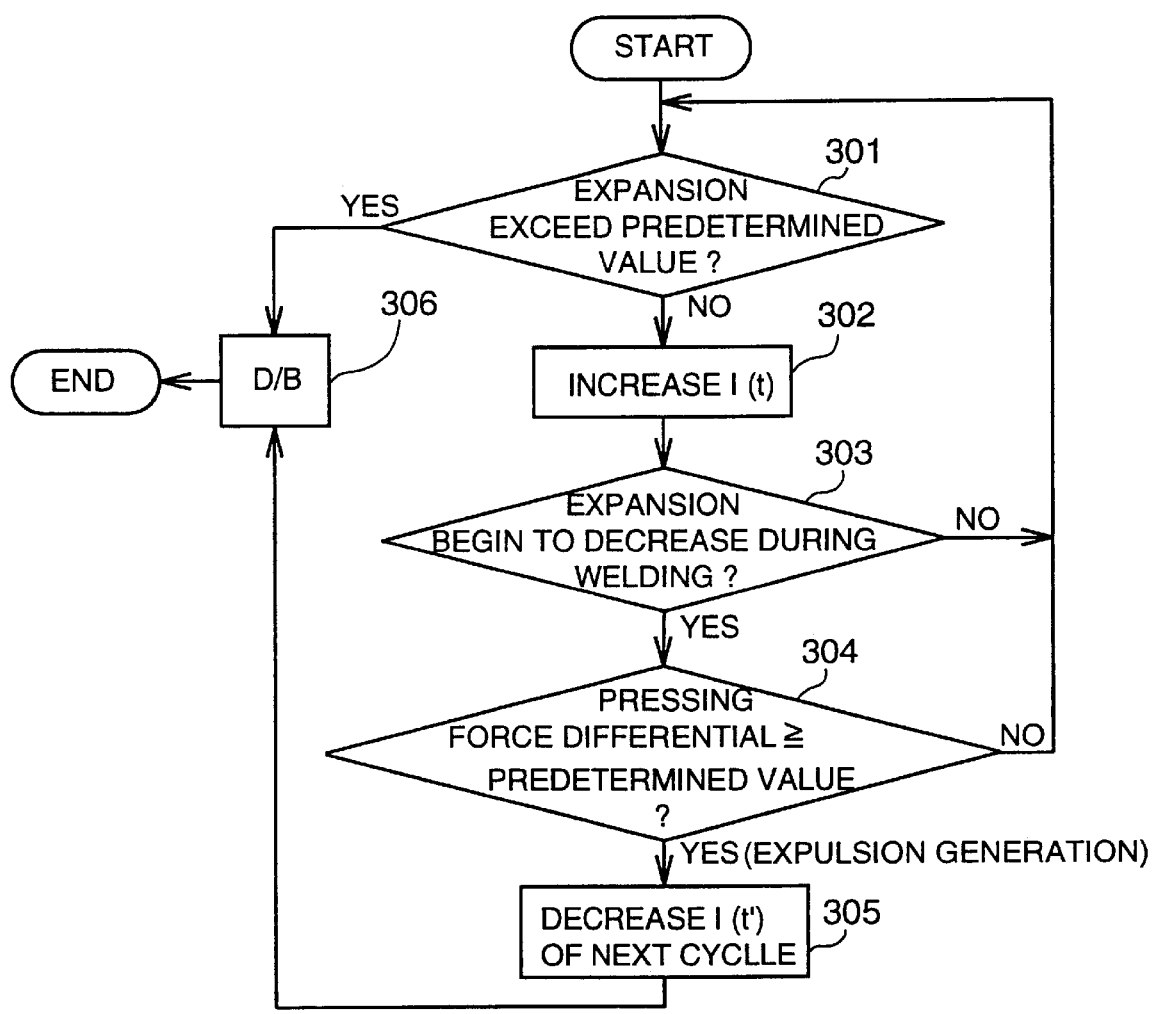
FIG. 11 is a flowchart illustrating a routine for controlling expulsion generation, which is conducted using the welding gun according to the embodiment of the present invention.

FIG. 11 illustrates a control routine in accordance with the fourth method, more particularly, the control method which suppresses the expulsion generation in the corresponding welding point in the next cycle. The control routine is stored in the control unit 30.

In the control routine, at step 301, it is determined whether the thermal expansion quantity is equal to or greater than a predetermined value (which is a thermal expansion quantity when a satisfactory welding has been conducted). When the thermal expansion quantity is equal to or greater than the predetermined value, the routine proceeds to step 306, where the value of the thermal expansion quantity is stored into the database, and then proceeds to an end step. When it is determined that the thermal expansion quantity does not reach the predetermined value, the routine proceeds to step 302, where the current welding electric current I(t) is increased by a predetermined value, and then proceeds to step 303. At step 303, it is determined whether or not the thermal expansion quantity begins to decrease. When the thermal expansion quantity does not begin to decrease, it is determined that the expulsion is not generated, and the routine returns to step 301. When it is determined that the thermal expansion quantity begins to decrease at step 303, the routine proceeds to step 304, where it is determined whether or not a differential ΔF (=$F_1-F_2$, see FIG. 13) between the pressing force ($F_1$) or the position of the fixed side welding tip at the beginning of a decrease in the thermal expansion quantity and a pressing force ($F_2$) or a position of the fixed side welding tip after a predetermined period of time Δt (see FIG. 13) has passed from the beginning of a decrease in the thermal expansion quantity exceeds a predetermined value $F_0$. When the differential ΔF is less than the predetermined value $F_0$, it is determined that the expulsion is not generated and the routine then returns to step 301. When the differential ΔF exceeds the predetermined value $F_0$, which means that a sudden change (decrease) in the pressing force or the position of the fixed side welding tip is caused, it is determined that the expulsion is generated and the routine proceeds to step 305, where the welding electric current I(t)' of the corresponding welding point in the next cycle is set to be smaller than the welding electric current I(t) of the current welding point.

Due to this operation, an expulsion is suppressed from generating in the corresponding welding point in the next cycle.

Further, in accordance with the fifth method, as illustrated in FIG. 11, data about the thermal expansion quantity after the current welding is conducted, information about whether re-welding has been conducted and information about whether the expulsion has been generated are stored into a memory at each welding point at step 306. Then, these data are periodically stored into a managing system of a higher level. Due to this operation, managing a welding quality is possible.

A sixth method, a control method for suppressing an expulsion generation in the current welding point, will be explained with reference to FIGS. 12 and 13.

The sixth control method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is not necessarily disposed in the moving side portion 10. The driving device 12 may be a servo motor, or may be an air cylinder.

The sixth method includes:

① obtaining a thermal expansion quantity of a welding portion 61, a position of the fixed side welding tip 21, a differential value (dx/dt) of the position, a pressing force, and a differential value (dF/dt) of the pressing force, which change at every moment, from detected values detected at every moment by the fixed side sensor 23;

② determining whether or not a sign of an expulsion generation exists in the welding portion 61 by comparing the differential value (dx/dt) of the position of the fixed side welding tip 21 and/or the differential value (dF/dt) of the pressing force from the point at which the thermal expansion quantity begins to decrease with a predetermined value or values, at every moment; and ③ decreasing or stopping the welding electric current I(t) of the current welding point, and/or, reducing the pressing force when the sign of the expulsion generation exists, thereby reflecting the detected values on the welding electric current and/or the pressing force in realtime.

Figure 12:
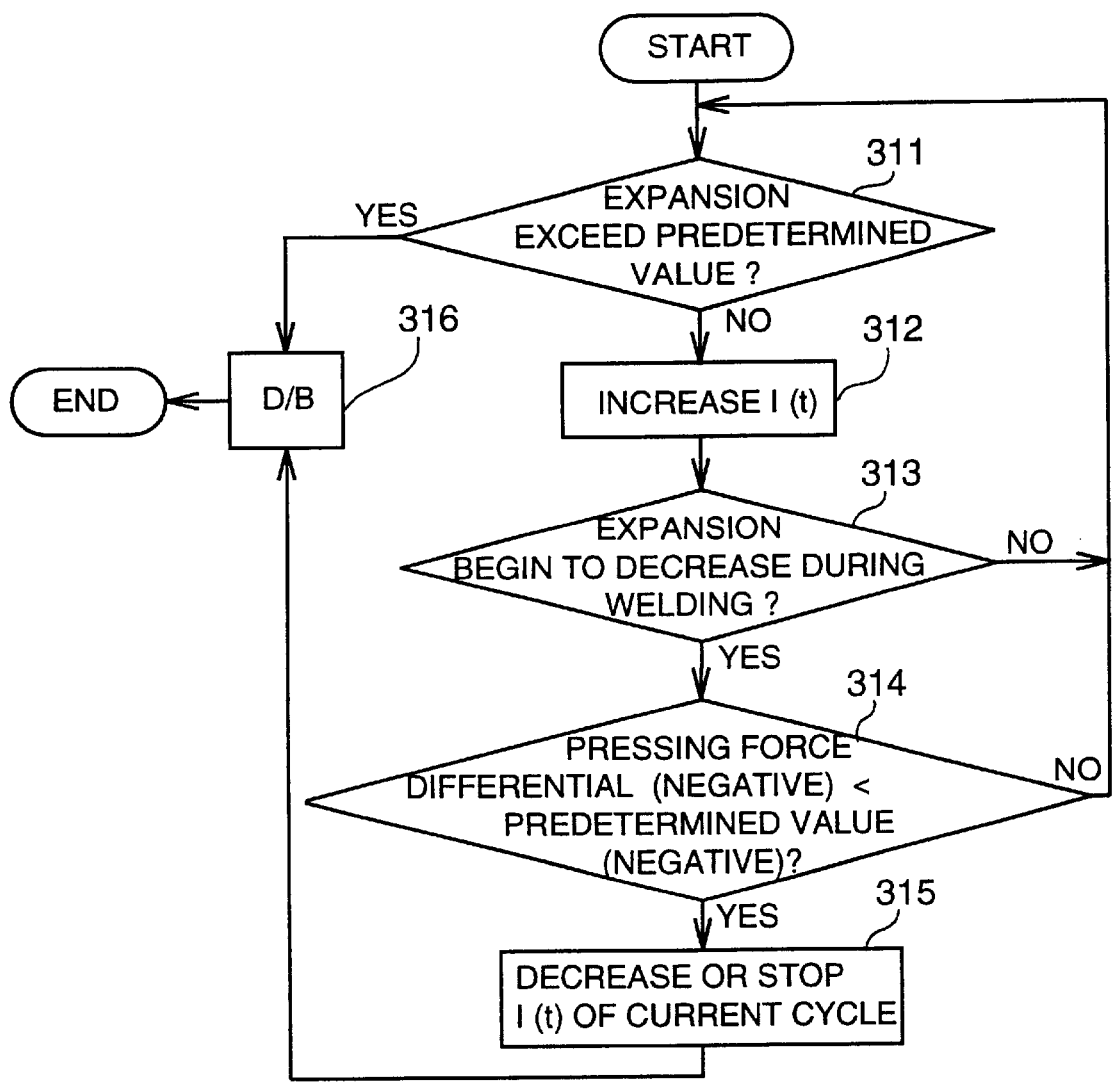
FIG. 12 is a flowchart illustrating a routine for controlling an expulsion generation in the current welding point, which is conducted using the welding gun according to the embodiment of the present invention.

FIG. 12 illustrates a control routine in accordance with the sixth method, more particularly, the control method of suppressing the expulsion generation in the current welding point. The control routine is stored in the control unit 30.

In the control routine, at step 311, it is determined whether or not the thermal expansion quantity is equal to or greater than a predetermined value (which is a thermal expansion quantity when a satisfactory welding has been conducted). When the thermal expansion quantity is equal to or a greater than the predetermined value, the routine proceeds to step 316 where the value of the thermal expansion quantity is stored into the database, and then proceeds to an end step. When it is determined at step 311 that the thermal expansion quantity has not reached the predetermined value, the routine proceeds to step 312 where the current welding electric current is increased by a predetermined value, and the routine then proceeds to step 313. At step 313, it is determined whether or not the thermal expansion quantity is beginning to decrease. When it is determined that the thermal expansion quantity is not beginning to decrease, it is determined that an expulsion has not been generated and the routine returns to step 311. When it is determined at step 313 that the thermal expansion quantity is beginning to decrease, the routine proceeds to step 314. At step 314, a differential value dF/dt (including ΔF/Δt) of the pressing force and/or a differential value dx/dt (including Δx/Δt) of the position of the fixed side welding tip from the beginning of the decrease in the thermal expansion quantity are calculated and are compared with a predetermined value or values $F_0$ and/or $x_0$, at every moment. When the differential values dF/dt and/or dx/dt, which are negative values, are equal to or greater than the predetermined values $F_0$ and/or $x_0$, which are negative values, it is determined that the sign of the expulsion generation does not exist, and the routine returns to step 311. When the differential values dF/dt and/or dx/dt are smaller than the predetermined values $F_0$ and/or $x_0$, which means that gradients of curves of the pressing force and/or the position of the fixed side welding tip suddenly change, it is determined that the sign of the expulsion generation exists and the routine proceeds to step 315, where the welding electric current I(t) of the current welding point is decreased or stopped.

Due to this operation, the expulsion is prevented from being generated in the current welding point.

A seventh method, a method for controlling a welding strength, will be explained with reference to FIGS. 13 and 14.

The seventh control method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is not necessarily disposed in the moving side portion 10. The driving device 12 may be a servo motor, or may be an air cylinder.

The seventh method includes:

① determining whether a thermal expansion quantity of the welding portion 61 detected by the fixed side sensor 23 is equal to or greater than a predetermined value, ending welding of the current welding point when the thermal expansion quantity is equal to or greater than the predetermined value;

② increasing a welding electric current I(t) when the thermal expansion quantity is smaller than the predetermined value; and ③ decreasing the welding electric current I(t) when a decrease in the thermal expansion quantity is found during welding.

Figure 14:
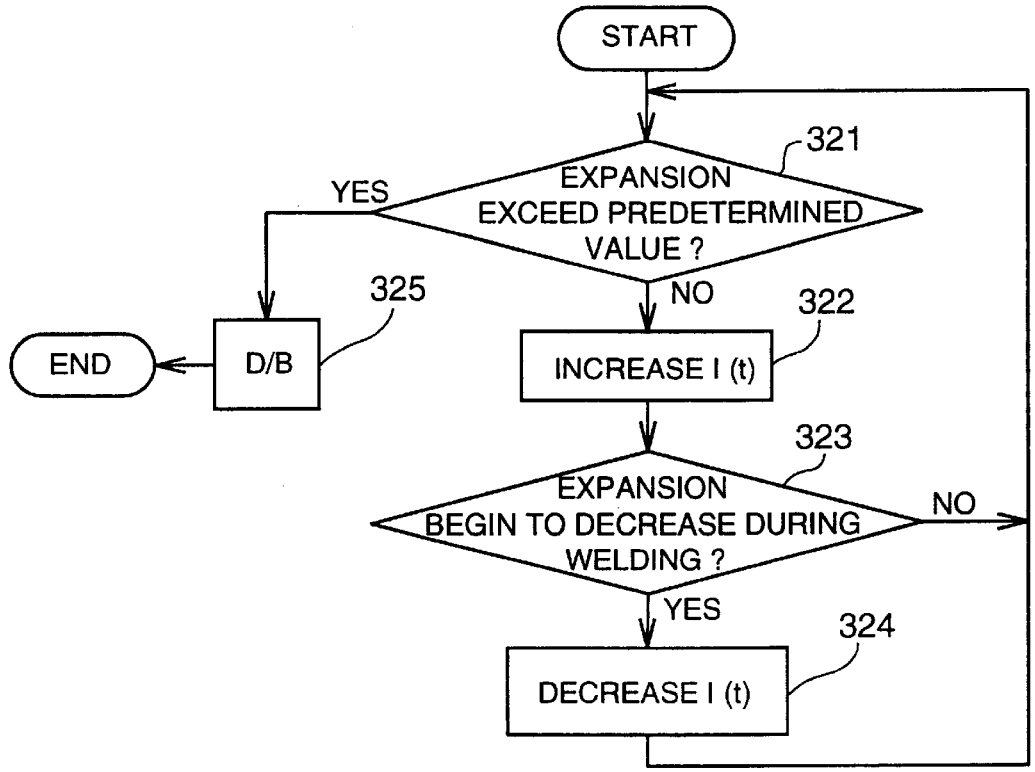
FIG. 14 is a flowchart illustrating a routine for controlling welding strength, which is conducted using the welding gun according to the embodiment of the present invention.

FIG. 14 illustrates a control routine in accordance with the seventh method, more particularly, the method of controlling a welding strength. The control routine is stored in the control unit 30.

In the control routine, at step 321, it is determined whether or not the thermal expansion quantity is equal to or greater than a predetermined value (which is a predetermined thermal expansion quantity when a satisfactory welding has been conducted). When the thermal expansion quantity is equal to or greater than the predetermined value, the routine proceeds to step 325, where the data of the thermal expansion quantity is stored into the database, and the routine then proceeds to an end step. When it is determined at step 321 that the thermal expansion quantity does not reach the predetermined value, the routine proceeds to step 322, where the welding electric current of the current welding point is increased by a predetermined value ΔI(t), and the routine then proceeds to step 323. At step 323, it is determined whether the thermal expansion quantity is beginning to decrease during welding. When it is determined that the thermal expansion quantity is not beginning to decrease, it is determined that the expulsion has not been generated, and the routine returns to step 321. When it is determined at step 323 that the thermal expansion quantity is beginning to decrease, the routine proceeds to step 324, where the current welding electric current is decreased by a predetermined value ΔI(t)', and the routine returns to step 321.

Due to this operation, a welding having a predetermined thermal expansion quantity, that is a welding having a necessary welding strength can be conducted by a maximum welding electric current and in a minimum period of time, thereby preventing an expulsion from being generated at the current welding point.

Figure 15:
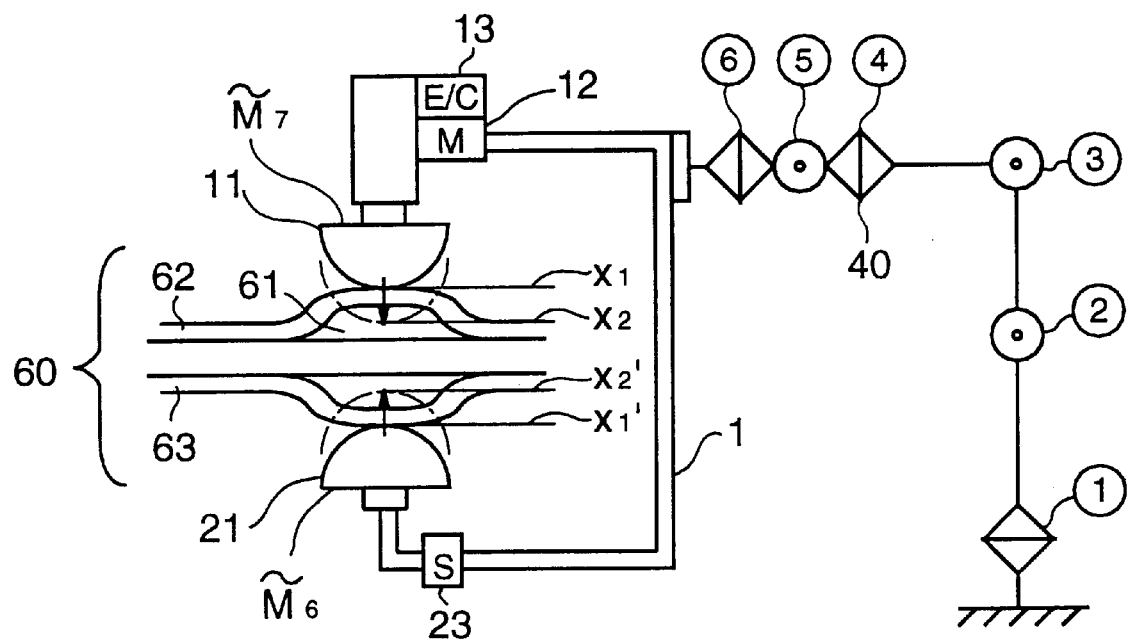
FIG. 15 is a cross-sectional view illustrating a relationship between workpieces having a clearance therebetween and positions of the welding tips.

An eighth method, a control method in which when a clearance exists between workpieces the clearance is eliminated and then welding is conducted, will be explained with reference with FIGS. 15 and 16.

The eighth method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is disposed in the moving side portion 10 for detecting at least one of a position of the moving side welding tip 11 and a pressing force caused in the moving side welding tip 11.

The eighth method includes:

① detecting contacting positions $x_1$ and $x_1'$ of the moving side welding tip 11 and the fixed side welding tip 21 with a workpiece 60, respectively, when the moving side welding tip 11 and the fixed welding tip 21 begin to contact the workpiece 60;

② calculating differentials ($x_T-x_1$, $x_T'-x_1'$) between objective positions $x_T$ and $x_T'$ of the moving side welding tip 11 and the fixed side welding tip 21, respectively, which are previously stored in a welding robot 40, and the contacting positions $x_1$ and $x_1'$, respectively; and ③ continuing pressing the workpiece 60, when differentials exist between the objective positions $x_T$ and $x_T'$ and the contacting positions $x_1$ and $x_1'$, respectively, based on gains proportional to the differentials till the differentials become zero.

Figure 16:
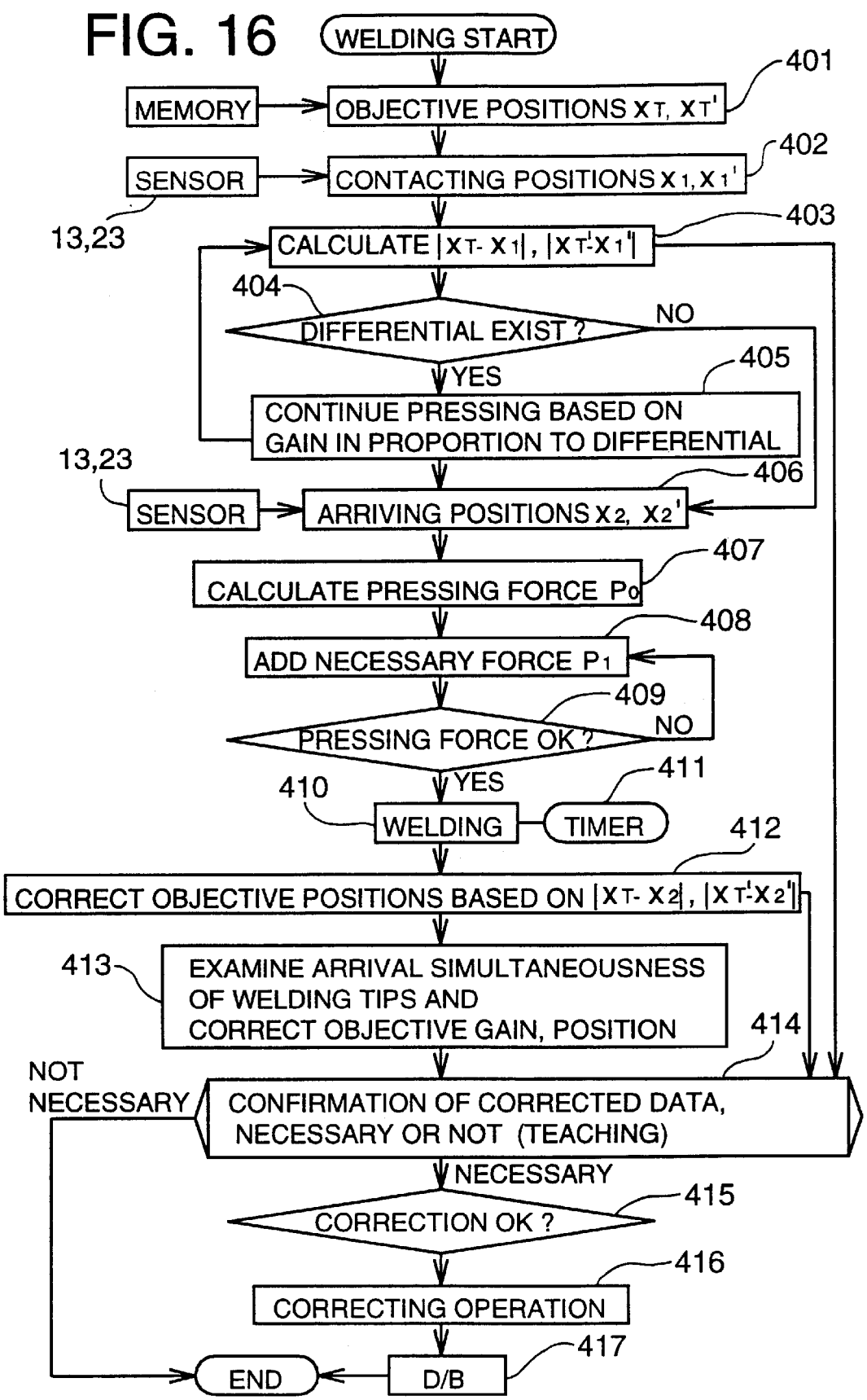
FIG. 16 is a flowchart illustrating a routine including a clearance reduction control, a pressing force control and a robot track control, which is conducted using the welding gun according to the embodiment of the present invention.

FIG. 16 illustrates a control routine in accordance with the eighth method.

At step 401, the objective positions $x_T$ and $x_T'$ of the moving side welding tip 11 and the fixed side welding tip 21, which are previously stored in a RAM (random access memory) of the control unit 30 of the welding robot 40, are entered into a CPU (central processing unit). Then, at step 402, the contacting positions $x_1$ and $x_1'$ of the moving side welding tip 11 and the fixed side welding tip 21 when the moving side tip 11 and the fixed side tip 21 begin to contact workpieces 62 and 63, respectively, are detected by the sensors 13 and 23 and then entered into the computer.

At step 403, differentials ($x_T-x_1$, $x_T'-x_1'$) between the objective positions $x_T$ and $x_T'$ and the actual contacting positions $x_1$ and $x_1'$ of the moving side welding tip 11 and the fixed side welding tip 21 are calculated.

Then, the routine proceeds to step 404, where it is determined whether or not differentials exist between the objective positions $x_T$ and $x_T'$ and the contacting positions $x_1$ and $x_1'$. When differentials exist, the routine proceeds to step 405, where pressing the workpieces 62 and 63 is continued based on gains proportional to the differentials till the welding tips move from the contacting positions $x_1$ and $x_1'$ to the objective positions $x_T$ and $x_T'$, and the routine then returns to the calculation step 403. When it is determined at step 404 that differentials do not exist, the routine proceeds to step 406, where arriving positions $x_2$ and $x_2'$ of the moving side welding tip 11 and the fixed side welding tip 21 are obtained from the current detected positions of the moving side welding tip 11 and the fixed side welding tip 21.

In accordance with the eighth method, differentials between the objective positions $x_T$ and $x_T'$ and the contacting positions $x_1$ and $x_1'$ of the moving side welding tip 11 and the fixed side welding tip 21 are calculated. When differentials exist, i.e., when a clearance 61 exists between the workpieces 62 and 63, pressing the workpieces 62 and 63 is continued based on gains proportional to the differentials. Due to this operation, the workpieces are pressed against each other and the clearance 61 is thus eliminated. Therefore, even if a clearance 61 exists between the workpieces 62 and 63, the clearance 61 will be eliminated before welding is conducted, which enables a spot-welding of a high quality to be performed.

A ninth method, which is a method of controlling a pressing force, will be explained with reference to FIGS. 15 and 16.

The ninth method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is disposed in the moving side portion 10 for detecting at least one of a position of the moving side welding tip 11 and a pressing force caused in the moving side welding tip 11.

The ninth method includes:

① detecting contacting positions $x_1$ and $x_1'$ of the moving side welding tip 11 and the fixed side welding tip 21 with a workpiece 60, respectively, when the moving side welding tip 11 and the fixed welding tip 21 begin to contact the workpiece 60;

② calculating differentials ($x_T-x_1$, $x_T'-x_1'$) between objective positions $x_T$ and $x_T'$ of the moving side welding tip 11 and the fixed side welding tip 21, respectively, which are previously stored in a welding robot 40, and the contacting positions $x_1$ and $x_1'$, respectively; and ③ continuing pressing the workpiece 60, when differentials exist between the objective positions $x_T$ and $x_T'$ and the contacting positions $x_1$ and $x_1'$, respectively, based on gains proportional to the differentials and returning to the step of calculating differentials, while obtaining arriving positions $x_2$ and $x_2'$ of the moving side welding tip 11 and the fixed side welding tip 21, respectively, from the current detected positions of the moving side welding tip 11 and the fixed side welding tip 21 when differentials do not exist;

④ calculating a pressing force $P_0$ required for the moving side welding tip 11 and the fixed side welding tip 21 to reach the arriving positions $x_2$ and $x_2'$;

⑤ adding a pressing force $P_1$ necessary for welding to the pressing force $P_0$ and imposing the total pressing force: $P_T$ which is a summation of $P_0$ and $P_1$ on the workpiece 60; and ⑥ pressing a welding electric current between the moving side welding tip 11 and the fixed side welding tip 21, thereby conducting welding.

FIG. 16 illustrates a control routine in accordance with the ninth method.

At step 401, the objective positions $x_T$ and $x_T'$ of the moving side welding tip 11 and the fixed side welding tip 21, which are previously stored in the RAM of the control unit 30 of the welding robot 40, are entered into the CPU. Then, at step 402, the contacting positions $x_1$ and $x_1'$ of the moving side welding tip 11 and the fixed side welding tip 21 when the moving side tip 11 and the fixed side tip 21 begin to contact workpieces 62 and 63, respectively, are detected by the sensors 13 and 23 and then entered into the computer.

At step 403, differentials ($x_T-x_1$, $x_T'-x_1'$) between the objective positions $x_T$ and $x_T'$ and the actual contacting positions $x_1$ and $x_1'$ of the moving side welding tip 11 and the fixed side welding tip 21 are calculated.

Then, the routine proceeds to step 404, where it is determined whether differentials exist between the objective positions $x_T$ and $x_T'$ and the contacting positions $x_1$ and $x_1'$. When differentials exist, the routine proceeds to step 405, where pressing the workpieces 62 and 63 is continued based on gains proportional to the differentials till the welding tips move from the contacting positions $x_1$ and $x_1'$ to the objective positions $x_T$ and $x_T'$, and the routine then returns to the calculation step 403. When it is determined that differentials do not exist at step 404, the routine proceeds to step 406, where arriving positions $x_2$ and $x_2'$ of the moving side welding tip 11 and the fixed side welding tip 21 are obtained based on the current detected positions of the moving side welding tip 11 and the fixed side welding tip 21.

Then, the routine proceeds to step 407, where a pressing force $P_0$ required for the moving side welding tip 11 and the fixed side welding tip 21 to reach the arriving positions $x_2$ and $x_2'$ is calculated. The pressing force $P_0$ is a spring back force of workpieces 62 and 63 caused when the moving side welding tip 11 and the fixed side welding tip 21 move from the contacting positions $x_1$ and $x_1'$ to the arriving positions $x_2$ and $x_2'$, in a case where a clearance 61 exists between the workpieces 62 and 63.

Then, the routine proceeds to step 408, where a pressing force $P_1$ necessary for welding is added to the pressing force $P_0$ to obtain the total pressing force: $P_T = P_0 + P_1$. At step 409, it is determined whether or not the total pressing force $P_T$ should be imposed on the workpieces 62 and 63. When it is determined that the total pressing force $P_T$ should not be imposed, the routine returns to step 408, where the total pressing force $P_T$ is recalculated.

When it is determined at step 409 that the pressing force $P_T$ should be imposed on the workpieces 62 and 63, the routine proceeds to step 410, where the welding electric current is pressed between the moving side welding tip 11 and the fixed side welding tip 21, thereby conducting welding. Welding is conducted for a predetermined period of time which is set by a timer 411.

In accordance with the ninth control method, differentials between the objective positions $x_T$ and $x_T'$ and the contacting positions $x_1$ and $x_1'$ of the moving side welding tip 11 and the fixed side welding tip 21 are calculated. When differentials exist, i.e., when a clearance 61 exists between the workpieces 62 and 63, pressing the workpieces is continued based on gains proportional to the differentials. Due to this operation, the workpieces 62 and 63 are pressed against each other and the clearance 61 is thus eliminated. When the differentials become zero or the differentials do not exist, the pressing force $P_0$ required for the moving side welding tip 11 and the fixed side welding tip 21 to reach the arriving positions $x_2$ and $x_2'$ is calculated. The pressing force $P_0$ is a spring back force of the workpiece, and is imposed on the workpieces 62 and 63 for the purpose of removing the clearance 61 between the workpieces 62 and 63. The pressing force $P_1$ necessary for welding is added to the pressing force $P_0$ and the total pressing force $P_T$ is imposed on the workpiece. Due to this operation, even if a clearance exists between the workpieces, the required pressing force $P_1$ can be imposed on the workpieces, which enables a spot-welding of a high quality having a sufficient pressing force to be performed.

A tenth method, which is a method of correcting a track of a welding robot, will be explained with reference to FIGS. 15 and 16.

The tenth method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is disposed in the moving side portion 10 for detecting at least one of a position of the moving side welding tip 11 and a pressing force caused in the moving side welding tip 11.

The tenth method includes:

① detecting contacting positions $x_1$ and $x_1'$ of the moving side welding tip 11 and the fixed side welding tip 21 with a workpiece 60, respectively, when the moving side welding tip 11 and the fixed welding tip 21 begin to contact the workpiece 60;

② calculating differentials ($x_T$–$x_1$, $x_T'$–$x_1'$) between objective positions $x_T$ and $x_T'$ of the moving side welding tip 11 and the fixed side welding tip 21, respectively, which are previously stored in a welding robot 40, and the contacting positions $x_1$ and $x_1'$, respectively; and ③ continuing pressing the workpiece, when differentials exist between the objective positions $x_T$ and $x_T'$ and the contacting positions $x_1$ and $x_1'$, respectively, based on gains proportional to the differentials and returning to the calculating step, while obtaining arriving positions $x_2$ and $x_2'$ of the moving side welding tip 11 and the fixed side welding tip 21, respectively, from the current detected positions of the moving side welding tip 11 and the fixed side welding tip 21 when differentials do not exist; and ④ correcting the objective positions $x_T$ and $x_T'$ so that the differentials between the objective positions $x_T$ and $x_T'$ and the arriving positions $x_2$ and $x_2'$, respectively, become zero.

FIG. 16 also illustrates a control routine in accordance with the tenth method for correcting the track of the welding robot.

At step 401, the objective positions $x_T$ and $x_T'$ of the moving side welding tip 11 and the fixed side welding tip 21, which are previously stored in the RAM of the control unit 30 of the welding robot 40, are entered into the CPU. Then, at step 402, the contacting positions $x_1$ and $x_1'$ of the moving side welding tip 11 and the fixed side welding tip 21 when the moving side tip 11 and the fixed side tip 21 contact workpieces 62 and 63, respectively, are detected by the sensors 13 and 23 and then entered to the computer.

At step 403, differentials ($x_T$–$x_1$, $x_T'$–$x_1'$) between the objective positions $x_T$ and $x_T'$ and the real contacting positions $x_1$ and $x_1'$ of the moving side welding tip 11 and the fixed side welding tip 21 are calculated Then, the routine proceeds to step 404, where it is determined whether or not differentials exist between the objective positions $x_T$ and $x_T'$ and the contacting positions $x_1$ and $x_1'$. When differentials exist, the routine proceeds to step 405, where pressing the workpiece 62 and 63 is continued based on gains proportional to the differentials, and the routine then returns to the calculation step 403. When it is determined at step 404 that differentials do not exist, the routine proceeds to step 406, where arriving positions $x_2$ and $x_2'$ of the moving side welding tip 11 and the fixed side welding tip 21 are obtained based on the current detected positions of the moving side welding tip 11 and the fixed side welding tip 21.

Then, the routine proceeds directly to step 412, or the routine proceeds to step 412 through pressing force control steps 407 to 411.

In a case where the routine proceeds to step 412 through the pressing force steps 407 to 411, the routine first proceeds to step 407, where a pressing force $P_0$ required for the moving side welding tip 11 and the fixed side welding tip 21 to reach the arriving positions $x_2$ and $x_2'$ is calculated. The pressing force $P_0$ is a spring back force of the workpiece caused when the moving side welding tip 11 and the fixed side welding tip 21 move from the contacting positions $x_1$ and $x_1'$ to the arriving positions $x_2$ and $x_2'$, in a case where a clearance 61 exists between the workpieces 62 and 63.

The routine proceeds to step 408, where a pressing force $P_1$ necessary for welding is added to the pressing force $P_0$ to obtain the total pressing force: $P_T=P_0+P_1$. At step 409, it is determined whether or not the total pressing force $P_T$ should be imposed on the workpieces 62 and 63. When it is determined that the total pressing force $P_T$ should not be imposed, the routine returns to step 408, where the pressing force $P_T$ is recalculated.

When it is determined at step 409 that the pressing force $P_T$ should be imposed on the workpieces 62 and 63, the routine proceeds to step 410, where the welding electric current is pressed between the moving side welding tip 11 and the fixed side welding tip 21 thereby conducting welding. Welding is conducted for a predetermined period of time which is set by timer 411.

Then, the routine proceeds to step 412, where the objective positions $x_T$ and $x_T'$ are corrected so that the differentials between the objective positions $x_T$ and $x_T'$ and the arriving positions $x_2$ and $x_2'$, respectively, become zero. Due to this operation, correction of the welding robot track, i.e., correction of the objective positions $x_T$ and $x_T'$ is performed.

Then, the routine proceeds to an end step, or the routine proceeds to the end step through steps 413 to 416 when necessary.

At step 413, when the arriving positions $x_2$ and $x_2'$ are expressed in the form of time functions $x_2$ (t) and $x_2'$ (t'), a simultaneous arrival of the moving side welding tip 11 and the fixed side welding tip 21 to the arriving points is examined by comparing arrival times t and t', and objective gains and objective positions $x_T$ and $x_T'$ are corrected so that the arrival times t and t' are equal to each other.

Then, at step 414, it is determined whether or not confirmation of the above data and correction of the program using the data should be conducted. When the confirmation and correction operation is not necessary, the routine directly proceeds to the end step, where the routine ends. When the confirmation and correction operation is necessary, it is determined at step 415 whether the correction may be conducted, by the operator or by learning control of the control unit 30. When the correction may be conducted, the routine proceeds to step 416, where the correction is performed. Then, the routine proceeds to step 417, where the above data including the corrected data are stored into the database, and the routine proceeds to the end step, where the routine ends.

The data stored into the database at step 417 can be used for various kinds of managements such as management of a strength at every welding point of an automobile body and management of welding deformation of an automobile body.

The routine may proceed to step 414 directly from step 403 or step 412.

In accordance with the tenth method of correcting the track of the welding robot, the objective positions $x_T$ and $x_T'$ can be corrected to the real arriving positions $x_2$ and $x_2'$.

Finally, an eleventh method, which is a method of managing a change in a positional accuracy at a welding point, will be explained with reference to FIGS. 17–21.

The eleventh method is conducted using the welding gun 1. The welding gun 1 includes a moving side portion 10 including a moving side welding tip 11 and a driving device 12 for driving the moving side welding tip 11 and a fixed side portion 20 including a fixed side welding tip 21 and an arm 22 supporting the fixed side welding tip 21. A fixed side sensor 23 is disposed in the fixed side portion 20 for detecting at least one of a position of the fixed side welding tip 21 and a pressing force imposed on the fixed side welding tip 21. A moving side sensor 13 is disposed in the moving side portion 10 for detecting at least one of a position of the moving side welding tip 11 and a pressing force caused in the moving side welding tip 11.

The eleventh method includes:

① entering positional information $x_1$, $x_1'$, $x_2$ and $x_2'$ from a database storing, at steps 306, 316, 325, 417, etc., contacting positions $x_1$ and $x_1'$ of the moving side welding tip 11 and the fixed side welding tip 21 with a workpiece 60 at a time when the moving side welding tip 11 and the fixed side welding tip 21 begin to contact the workpiece 60, and arriving positions $x_2$ and $x_2'$ of the moving side welding tip 11 and the fixed side welding tip 21 at a time when the moving side welding tip 11 and the fixed side welding tip 21 have fully pressed the workpiece 60;

② calculating a positional accuracy matrix (vector) of each station 70 with respect to a plurality of stations 70 each having at least one robot 40, the matrix being defined by the following:

$$|\Phi_n|=[|P_1|, |P_2|, \ldots, |P_m|]$$

wherein,
n: No. n station (that is, a station number of the current station)
m: the number of robots equal to or greater than 1, of the No. n station
$|P_j|$: a positional accuracy matrix of a robot (No. j robot), obtained from welding points $P_1, P_2, \ldots,$ and $P_k$ and positions $x_1, x_1', x_2,$ and $x_2'$ of the robot; and ③ managing a positional accuracy change of the welding point of the workpiece based on a value and/or values defined by: $|\Phi_n|-|\Phi_{n-1}|$ and/or $|\Phi_n|-|\Phi_1|$.

Each matrix will be explained more in detail.

In a case where each welding robot 40 is a six-articulation-type robot having a seven axis constituted by a welding gun axis (FIG. 17), the positional accuracy matrix $|P_j|$ is defined by a matrix illustrated in FIG. 18. The matrix $|P_j|$ is a composite matrix of a positional accuracy matrix $|M_6|$ of the fixed side welding tip 21 and a positional accuracy matrix $|M_7|$ of the moving side welding tip 11. The positional accuracy matrix $|M_6|$ of the fixed side welding tip 21 is identical to a positional matrix of a tip end of the six-articulation of the robot. The positional accuracy matrix $|M_7|$ of the moving side welding tip 11 is identical to a positional matrix of a tip end of the welding gun axis. When references $P_1, P_2, \ldots,$ and $P_k$ express respective welding points of each robot, the matrix $|M_6|$ is made by arranging the contacting positions $x_1'$ of the fixed side welding tip 21 with the workpiece at the welding points in a column and arranging the arriving positions $x_2'$ of the fixed side welding tip at the welding point in a column, and the matrix $|M_7|$ is made by arranging the contacting positions $x_1$ of the moving side welding tip 11 with the workpiece at the welding points in a column and the arriving position $x_2$ of the moving side welding tip at the welding points in a column.

As illustrated in FIG. 19, in a case where robots are provided by m in number (where m is an integer equal to or greater than 1) is positioned at No. n welding station, a positional accuracy matrix or vector of the station 70 is made by arranging the positional accuracy matrices of the welding robot $|P_1|, |P_2|, \ldots, |P_m|$ of the No. n station in a row, that is, is expressed by the following equation:

$$|\Phi_n|=[|P_1|, |P_2|, \ldots, |P_m|]$$

Then, by calculating a differential ($|\Phi_n|-|\Phi_{n-1}|$) between the positional accuracy matrix of No. n station and the positional accuracy matrix of the previous No. n-1 station, a deformation of the workpiece caused between No.n station and No.n-1 station due to spot-welding is obtained. Further, by calculating a differential ($|\Phi_n|-|\Phi_1|$), a deformation of the workpiece caused between No. 1 station and No. n station due to spot-welding is obtained.

Figure 20:
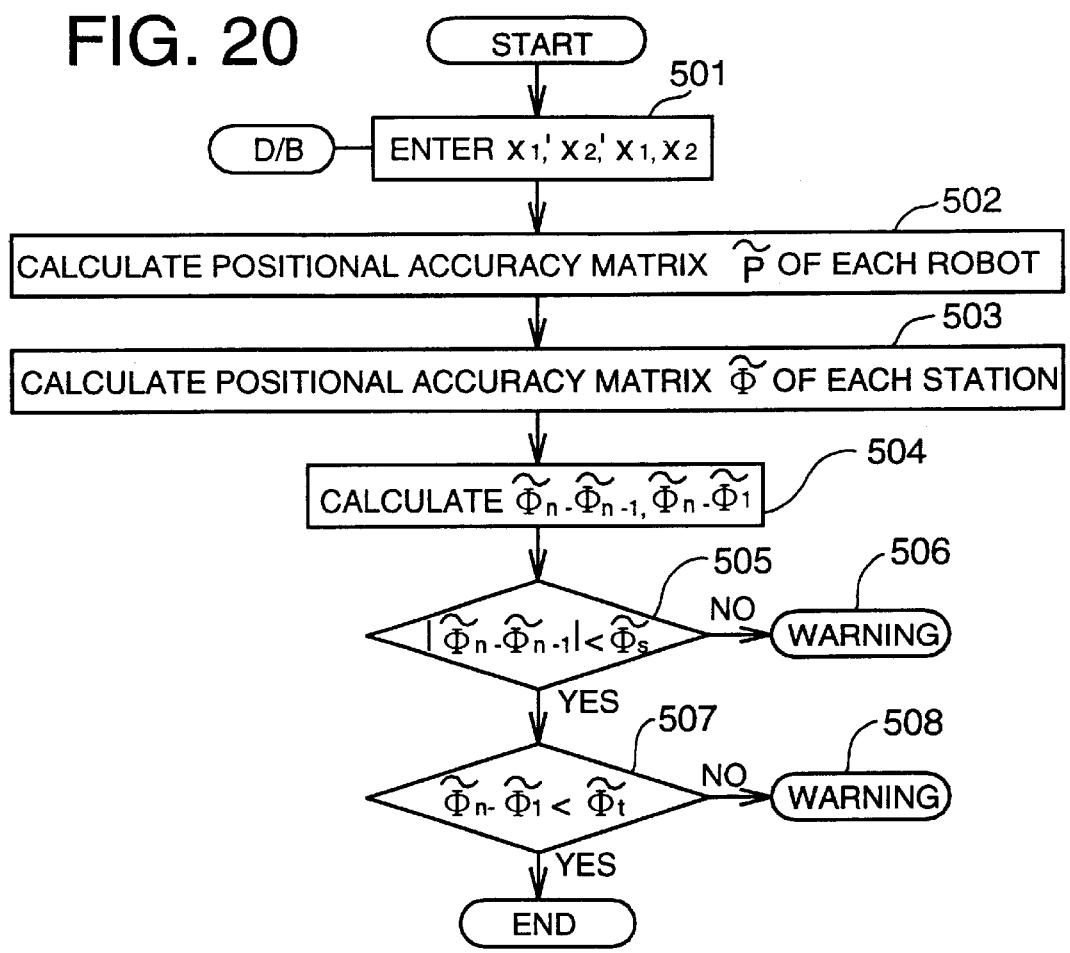
FIG. 20 is a flowchart illustrating a routine of managing a change in positional accuracy at a welding point, which is conducted using the welding gun according to the embodiment of the present invention.

FIG. 20 illustrates a routine of calculating a deformation of the workpiece due to spot-welding. At step 501, positional data $x_1, x_1', x_2$, and $x_2'$ at the respective welding points are entered from the database which has stored those data at step 417 of FIG. 16. Then, at step 502, the positional accuracy matrix $|P_m|$ of each welding robot 40 is made, and, at step 503, the positional accuracy matrix $|\Phi_n|$ of each station 70 is made. Then, at step 504, differentials $|\Phi_n|-|\Phi_{n-1}|$ and $|\Phi_n|-|\Phi_n|$ are calculated, respectively. At step 505, it is determined whether or not the calculated value ($|\Phi_n|-|\Phi_{n-1}|$) is smaller than a predetermined allowable deformation $|\Phi_s|$ between the stations. When the deformation is equal to or greater than the allowable deformation, a warning is issued. Similarly, at step 506, it is determined whether or not the calculated value $|\Phi_n|-|\Phi_1|$ is smaller than a predetermined allowable deformation $|\Phi_1|$. When the deformation is equal to or greater than the allowable deformation quantity, a warning is issued. No warnings mean that welding deformation of the workpiece has been satisfactorily suppressed. Due to this operation, managing of a welding deformation is possible.

Figure 21:
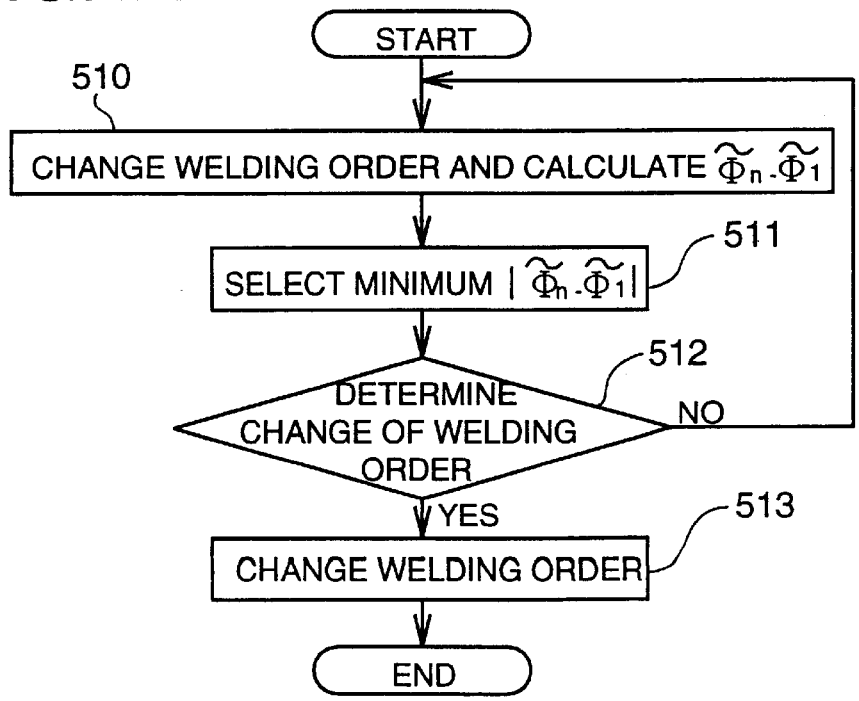
FIG. 21 is a flowchart illustrating a routine in a case where controlling a workpiece deformation to minimum is conducted using the managing method of a change in a positional accuracy at a welding point, which is conducted using the welding gun according to the embodiment of the present invention.

Further, the positional accuracy matrix $|\Phi_n|$ of the station 70 is also available to, for example, a method of determining an optimum welding order which makes a deformation of the workpiece minimum. FIG. 21 illustrates an example of the welding order management. At step 510, the welding order is variously changed, and with each welding order, $|\Phi_n|-|\Phi_1|$ is calculated. At step 511, the minimum one is selected from a plurality of values of $|\Phi_n|-|\Phi_1|$. At step 512, it is determined, by the operator or by the computer based on learning, whether or not the current welding order should be changed to that welding order having the minimum value of $|\Phi_n|-|\Phi_1|$. When it is determined that the welding order should be changed, the routine proceeds to step 513, where the welding order is changed. When it is determined that the welding order should not be changed, the routine returns to step 510, where the welding order is further changed and the routine is repeated.

According to the welding gun of the present invention, the following technical advantages are obtained:

First, since a sensor is provided in the fixed side portion, the sensor can be disposed in a portion of the welding gun where the mechanical impedance is smaller than that of the moving side portion and where it is not disposed via a gear such as a speed reducer from the welding tip. As a result, a displacement of the welding tip and a pressing force imposed on the welding tip can be detected with high accuracy and a good response. By controlling the welding gun according to the output of the sensor, a scope of objects capable of being, controlled is widened.

Second, since the mechanical impedance of the fixed side portion is set in a range where the sensor can effectively detect a displacement of the fixed side welding tip and the pressing force, the mechanical impedance of the fixed side portion can remain small, unlike a conventional welding gun in which the mechanical impedance of a fixed side portion is increased to be nearly equal to a mechanical impedance of the moving side portion. As a result, the arm supporting the fixed side welding tip can be decreased both in rigidity and in size as compared with the conventional welding gun, which makes the welding gun compact and lightweight.

Third, since the fixed side sensor is any one of a force sensor (a load sensor), an optical distance sensor (a displacement sensor) and a sensor using an optical fiber, a commercial sensor can be used.

Fourth, in the case where sensors are provided both in the fixed side portion and the moving side portion of the welding gun, the fixed side sensor and the moving side sensor constitute a redundant sensor measurement system.

According to various kinds of methods conducted using the above-described welding gun, the following technical advantages are obtained:

In accordance with the first method, that is a method of calibrating a sensor conducted using the welding gun, since the reference point of the fixed side sensor is calibrated in a state wherein the moving side welding tip is released from the fixed side welding tip, the reference point of the fixed side sensor can be calibrated based on an output of the moving side sensor.

In accordance with the second method, that is a method of calibrating a sensor conducted using the welding gun, since the moving side welding tip is pressed against the fixed side welding tip and the gains of the moving side sensor and the fixed side sensor are adjusted, one sensor can calibrate the other sensor.

In accordance with the third method, that is a method of controlling welding conducted using the welding gun, a re-welding feedback control can be conducted.

In accordance with the fourth method, that is a method of controlling welding conducted using the welding gun, expulsion generation at the corresponding welding point in the next cycle can be suppressed.

In accordance with the fifth method, that is a method of managing a welding quality conducted using the welding gun, since data about the expansion quantity, information about whether re-welding has been performed and information about whether expulsion has been generated are stored into the memory at every welding point and are periodically stored into the managing system of a higher level, a welding quality can be managed.

In accordance with the sixth method, that is a method of controlling welding conducted using the welding gun, expulsion generation at the current welding point can be suppressed.

In accordance with the seventh method, that is a method of controlling welding conducted using the welding gun, spot welding having a necessary welding strength can be conducted in a minimum time period under a condition that expulsion is not generated, whereby the welding strength can be controlled.

In accordance with the eighth method, that is a method of controlling welding conducted using the welding gun, a clearance between the workpieces is eliminated and welding is then conducted, so that spot welding of a high quality can be performed.

In accordance with the ninth method, that is a method of controlling a pressing force of welding conducted using the welding gun, even if a clearance exists between the workpieces, the pressing force $P_1$ necessary for welding can be imposed on the workpieces, so that spot welding of a high quality having a sufficient pressing force can be performed.

In accordance with the tenth method, that is a method of correcting a track of a welding robot conducted using the welding gun, the objective positions $x_T$, $x_T'$ can be corrected to the real arriving positions $x_2$, $x_2'$, whereby the track of the welding robot is modified and is prepared for welding of the corresponding welding point in the next cycle.

In accordance with the eleventh method, that is a method of controlling a change in a positional accuracy change at a welding point conducted using the welding gun, the positional accuracy matrix of each station $|\Phi_n|$ is calculated and a deformation of the workpiece can be managed.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A method of calibrating a sensor conducted using a welding gun which includes (1) a moving side portion including a moving side welding tip and a driving device for driving said moving side welding tip and (2) a fixed side portion including a fixed side welding tip and an arm supporting said fixed side welding tip, wherein a fixed side sensor for detecting at least one of a position of said fixed side welding tip and a pressing force imposed on said fixed side welding tip is provided in said fixed side portion, and a moving side sensor for detecting at least one of a position of said moving side welding tip and a pressing force caused in said moving side welding tip is provided in said moving side portion, said method comprising:

releasing said moving side welding tip from a position of contact with said fixed side welding tip; and calibrating at least one of a pressing force information and a positional information a reference point of the fixed side sensor.

2. A method of calibrating a sensor conducted using a welding gun which includes (1) a moving side portion including a moving side welding tip and a driving device for driving said moving side welding tip and (2) a fixed side portion including a fixed side welding tip and an arm supporting said fixed side welding tip, wherein a fixed side sensor for detecting at least one of a position of said fixed side welding tip and a pressing force imposed on said fixed side welding tip is provided in said fixed side portion, and a moving side sensor for detecting at least one of a position of said moving side welding tip and a pressing force caused in said moving side welding tip is provided in said moving side portion, said method comprising:

increasing pressure of said moving side welding tip against said fixed side welding tip and plotting a pressing force and/or a positional information to obtain characteristic curves of said moving side sensor and said fixed side sensor using a method of least squares; and determining gains of said sensors such that the gains of said moving side sensor and said fixed side sensor are equal to each other.

* * * * *